(12) United States Patent
Kitami et al.

(10) Patent No.: US 7,808,957 B2
(45) Date of Patent: Oct. 5, 2010

(54) WIRELESS LAN TERMINAL, WIRELESS LAN BASE STATION, WIRELESS COMMUNICATION METHOD, AND ROAMING METHOD

(75) Inventors: Hideo Kitami, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 1610 days.

(21) Appl. No.: 10/694,727

(22) Filed: Oct. 29, 2003

(65) Prior Publication Data
US 2004/0105439 A1 Jun. 3, 2004

(30) Foreign Application Priority Data
Nov. 28, 2002 (JP) ............................. 2002-345847

(51) Int. Cl.
H04W 4/00 (2009.01)
(52) U.S. Cl. ..................... 370/338; 370/252; 370/254; 370/328; 370/349; 370/389; 370/469; 370/473; 370/474; 455/432.1; 455/550.1
(58) Field of Classification Search ............. 455/432.1, 455/432.2, 432.3, 449, 552.1, 550.1; 370/349, 370/389, 392, 393, 408, 473, 474, 351, 352, 370/353, 252, 254, 395.1, 409, 469, 471, 370/475, 328, 329, 338; 709/230, 238, 245, 709/232, 236
See application file for complete search history.

(56) References Cited

U.S. PATENT DOCUMENTS

| 6,917,804 | B2 * | 7/2005 | Takayama et al. ......... 455/432.1 |
| 6,922,557 | B2 * | 7/2005 | Fantaske ..................... 455/403 |
| 7,058,059 | B1 * | 6/2006 | Henry et al. ............. 370/395.1 |
| 7,233,603 | B2 * | 6/2007 | Lee ............................. 370/445 |
| 2002/0196763 | A1 * | 12/2002 | Reynolds et al. ............ 370/338 |
| 2003/0063593 | A1 * | 4/2003 | Koyanagi et al. ........... 370/338 |
| 2003/0115359 | A1 * | 6/2003 | Ishibashi et al. ............ 709/238 |
| 2003/0223395 | A1 * | 12/2003 | Chitrapu ..................... 370/338 |
| 2004/0081203 | A1 * | 4/2004 | Sodder et al. ............... 370/469 |
| 2006/0062187 | A1 * | 3/2006 | Rune .......................... 370/338 |

FOREIGN PATENT DOCUMENTS

| JP | 06-69963 A | 3/1994 |
| JP | 8-97821 A | 4/1996 |
| JP | 9-8808 A | 1/1997 |
| JP | 11-74899 A | 3/1999 |
| JP | 11-136257 A | 5/1999 |

(Continued)

*Primary Examiner*—Charles N Appiah
*Assistant Examiner*—Olumide T Ajibade Akonai
(74) *Attorney, Agent, or Firm*—Sughrue Mion, PLLC

(57) ABSTRACT

The present invention makes it possible to expand wireless LAN areas without installing a plurality of LAN base stations or wireless LAN repeaters. A wireless LAN terminal has not only a wireless LAN terminal function to communicate with another wireless LAN base station, but also a wireless LAN base station function to communicates with a wireless LAN terminal. The wireless LAN terminal encapsulates a wireless LAN signal sent from another wireless LAN terminal and sends the encapsulated signal to the wireless LAN base station. The wireless LAN base station encapsulates a wireless LAN signal destined for a wireless LAN terminal and sends the encapsulated signal to another wireless LAN terminal.

7 Claims, 23 Drawing Sheets

FOREIGN PATENT DOCUMENTS

| JP | 11-252004 A | 9/1999 |
| JP | 2000-316023 A | 11/2000 |
| JP | 2001-237764 A | 8/2001 |
| JP | 2002-198892 A | 7/2002 |
| JP | 2003-304253 A | 10/2003 |

* cited by examiner

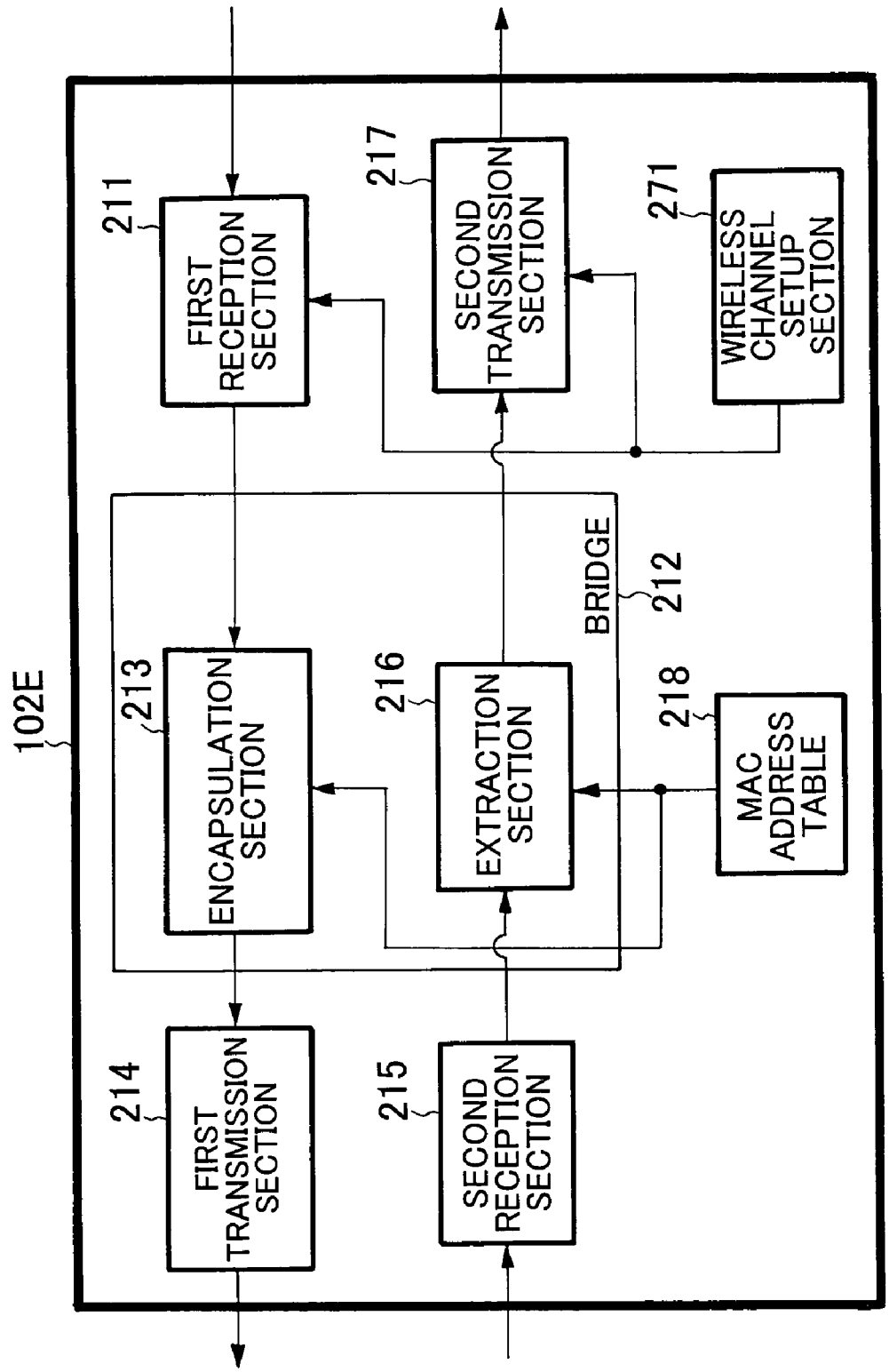

WIRELESS LAN TERMINAL, WIRELESS LAN BASE STATION, WIRELESS COMMUNICATION METHOD, AND ROAMING METHOD

BACKGROUND OF THE INVENTION

1. Field of the Invention

The present invention relates to a wireless LAN (Local Area Network) terminal, a wireless LAN base station connected thereto, a wireless communication method performed on the wireless LAN terminal, a wireless communication method performed on the wireless LAN base station, and a roaming method performed on the wireless LAN terminal.

2. Description of the Related Art

In recent years, there is a spreading use of wireless LAN terminals and wireless LAN base stations to perform wireless communication in compliance with standards such as IEEE (Institute of Electrical and Electronics Engineers) 802.11a, IEEE 802.11b, and the like. The wireless LAN terminal is mounted on a personal computer, a personal digital assistant, and the like. This makes it possible to allow the personal computer and the personal digital assistant to communicate with each other via the wireless LAN base station. When the wireless LAN base station has also a router and an ADSL (Asymmetric Digital Subscriber Line) modem, the personal computer and the personal digital assistant can access the Internet via the wireless LAN base station.

A prior art related to the present invention provides connection between a group of machines and a group of personal computers using a PHS (e.g., see patent document 1).

Another prior art related to the present invention allows communication between a first wireless data communication apparatus and a second wireless data communication apparatus via another wireless data communication apparatus (e.g., see patent document 2).

[Patent document 1] Japanese Patent Application Laid-Open Publication No. 1999-74899

[Patent document 2] Japanese Patent Application Laid-Open Publication No. 1996-97821

However, there is a limit on a distance capable of communication between the wireless LAN terminal and the wireless LAN base station. Conventionally, in order to eliminate such limit and expand a wireless LAN area, it has been necessary to install a plurality of wireless LAN base stations, make cable connection between the wireless LAN base stations, and install wireless LAN repeaters, for example. Disadvantages of additional installation costs, spaces, and labors result from such requirements as installing a plurality of wireless LAN base stations, making cable connection between the wireless LAN base stations, and installing wireless LAN repeaters.

The prior art of patent document 1 just connects a conventional PHS to a group of machines and a group of personal computers. According to the prior art of patent document 2, the first wireless data communication apparatus must check paths to the second wireless data communication apparatus before communicating with the second wireless data communication apparatus.

SUMMARY OF THE INVENTION

It is an object of the present invention to provide a wireless LAN terminal, a wireless LAN base station, a wireless communication method, and a roaming method capable of expanding wireless LAN areas without installing a plurality of LAN base stations or wireless LAN repeaters.

According to a first aspect of the present invention, there is provided a wireless LAN terminal comprising: a reception means for receiving a wireless LAN signal from another wireless LAN terminal; an encapsulation means for encapsulating the wireless LAN signal in OSI layer 2 by providing the wireless LAN signal with a header having its own terminal's MAC address as an originating MAC address and a wireless LAN base station's MAC address as a destination MAC address; and a transmission means for transmitting the encapsulated wireless LAN signal to the wireless LAN base station.

The wireless LAN terminal according to the first aspect may further comprise: a means for, when a first hierarchy inquiry is received from said another wireless LAN terminal, transmitting a second hierarchy inquiry containing a hierarchy incremented by one higher than a hierarchy contained in the first hierarchy inquiry to the wireless LAN base station; and a means for, when a first hierarchy response is received from the wireless LAN base station, transmitting a second hierarchy response containing the same hierarchy as that contained in the first hierarchy response to said another wireless LAN terminal.

The wireless LAN terminal according to the first aspect may further comprise: a start/stop means for starting or stopping the reception means based on a request from said another wireless terminal and a state of communication with said another wireless terminal.

The wireless LAN terminal according to the first aspect may further comprise a channel setup means for setting a wireless channel of the reception means.

According to a second aspect of the present invention, there is provided a wireless LAN base station comprising: an encapsulation means for encapsulating a wireless LAN signal destined for a first wireless LAN terminal in OSI layer 2 by providing the wireless LAN signal with a header having its own base station's MAC address as an originating MAC address and a second wireless LAN terminal's MAC address as a destination MAC address; and a transmission means for transmitting the encapsulated wireless LAN signal to the second wireless LAN terminal.

The wireless LAN terminal according to the second aspect may further comprise a means for, when a hierarchy inquiry is received from a wireless LAN terminal, returning a hierarchy response containing the same hierarchy as that contained in the hierarchy inquiry to the wireless LAN terminal which has transmitted the hierarchy inquiry.

According to a third aspect of the present invention, there is provided a wireless LAN terminal comprising: a reception means for receiving a wireless LAN signal which is destined for another wireless LAN terminal and is encapsulated in OSI layer 2 by being provided with a header having a wireless LAN base station's MAC address as an originating MAC address and own terminal's MAC address as a destination address; an extraction means for extracting the wireless LAN signal from the encapsulated wireless LAN signal; and a transmission means for transmitting the extracted wireless LAN signal to said another wireless LAN terminal.

The wireless LAN terminal according to the third aspect may further comprise: a means for, when a first hierarchy inquiry is received from said another wireless LAN terminal, transmitting a second hierarchy inquiry containing a hierarchy incremented by one higher than a hierarchy contained in the first hierarchy inquiry to said another wireless LAN base station; and a means for, when a first hierarchy response is received from the wireless LAN base station, transmitting a second hierarchy response containing the same hierarchy as that contained in the first hierarchy response to said another wireless LAN terminal.

The wireless LAN terminal according to the third aspect may further comprise: a start/stop means for starting or stopping the transmission means based on a request from said another wireless terminal and a state of communication with said another wireless terminal.

The wireless LAN terminal according to the third aspect may further comprise: a channel setup means for setting a wireless channel of the transmission means.

According to a fourth aspect of the present invention, there is provided a wireless LAN terminal comprising: a reception means for receiving a wireless LAN signal which is transmitted from a first wireless LAN terminal and is encapsulated in OSI layer 2 by being provided with a header having a second wireless LAN terminal's MAC address as an originating MAC address and own base station's MAC address as a destination address; and an extraction means for extracting the wireless LAN signal from the encapsulated wireless LAN signal.

The wireless LAN terminal according to the fourth aspect may further comprise: a means for, when a hierarchy inquiry is received from a wireless LAN terminal, returning a hierarchy response containing the same hierarchy as that contained in the hierarchy inquiry to the wireless LAN terminal which have transmitted the hierarchy inquiry.

According a fifth aspect of the present invention, there is provided a wireless LAN terminal comprising: a first reception means for receiving a wireless LAN signal from another wireless LAN terminal; an encapsulation means for encapsulating the wireless LAN signal in OSI layer 2 by providing the wireless LAN signal with a header having its own terminal's MAC address as an originating MAC address and a wireless LAN base station's MAC address as a destination MAC address; a first transmission means for transmitting the encapsulated wireless LAN signal to the wireless LAN base station; a second reception means for receiving a wireless LAN signal which is destined for said another wireless LAN terminal and is encapsulated in OSI layer 2 by being provided with a header having the wireless LAN base station's MAC address as an originating MAC address and own terminal's MAC address as a destination address; an extraction means for extracting the wireless LAN signal from the encapsulated wireless LAN signal received by the second reception means; and a second transmission means for transmitting the extracted wireless LAN signal to said another wireless LAN terminal.

The wireless LAN terminal according to the fifth aspect may further comprise: a means for, when a first hierarchy inquiry is received from said another wireless LAN terminal, transmitting a second hierarchy inquiry containing a hierarchy incremented by one higher than a hierarchy contained in the first hierarchy inquiry to the wireless LAN base station; and a means for, when a first hierarchy response is received from the wireless LAN base station, transmitting a second hierarchy response containing the same hierarchy as that contained in the first hierarchy response to said another wireless LAN terminal.

In the wireless LAN terminal according to the fifth aspect, the first reception means and the second reception means may operate in a time sharing manner using a common wireless LAN module; and the first transmission means and the second transmission means may operate in a time sharing manner using a common wireless LAN module.

The wireless LAN terminal according to the fifth aspect may further comprise: a start/stop means for starting or stopping the first reception means and the second transmission means based on a request from said another wireless terminal and a state of communication with said another wireless terminal.

The wireless LAN terminal according to the fifth aspect may further comprise: a channel setup means for setting a wireless channel of the first reception means and a wireless channel of the second transmission means.

According to a sixth aspect of the present invention, there is provided a wireless LAN terminal which communicates with a wireless LAN base station directly or via another wireless LAN terminal, comprising: an inquiry means for sending a hierarchy inquiry to said another wireless LAN terminal and, if possible, to the wireless LAN base station; and a roaming means for roaming from said another wireless LAN terminal to the wireless LAN base station when it is detected that a hierarchy indicated by a hierarchy response from the wireless LAN base station to the hierarchy inquiry is lower than a hierarchy indicated by a hierarchy response from said another wireless LAN terminal to the hierarchy inquiry.

According to a seventh aspect of the present invention, there is provided a wireless communication method comprising the steps of: receiving a wireless LAN signal from another wireless LAN terminal; encapsulating the wireless LAN signal in OSI layer 2 by providing the wireless LAN signal with a header having its own wireless LAN terminal's MAC address as an originating MAC address and a wireless LAN base station's MAC address as a destination MAC address; and transmitting the encapsulated wireless LAN signal to the wireless LAN base station.

According to a eighth aspect of the present invention, there is provided a wireless communication method comprising the steps of: encapsulating a wireless LAN signal destined for a first wireless LAN terminal in OSI layer 2 by providing the wireless LAN signal with a header having its own wireless LAN base station's MAC address as an originating MAC address and a second wireless LAN terminal's MAC address as a destination MAC address; and transmitting the encapsulated wireless LAN signal to the second wireless LAN terminal.

According to a ninth aspect of the present invention, there is provided a wireless communication method comprising the steps of: receiving a wireless LAN signal which is destined for another wireless LAN terminal and is encapsulated in OSI layer 2 by being provided with a header having a wireless LAN base station's MAC address as an originating MAC address and own terminal's MAC address as a destination address; extracting the wireless LAN signal from the encapsulated wireless LAN signal; and transmitting the extracted wireless LAN signal to said another wireless LAN terminal.

According to a tenth aspect of the present invention, there is provided a wireless communication method comprising the steps of: receiving a wireless LAN signal which is transmitted from a first wireless LAN terminal and is encapsulated in OSI layer 2 by being provided with a header having a second wireless LAN terminal's MAC address as an originating MAC address and own wireless LAN base station's MAC address as a destination address; and extracting the wireless LAN signal from the encapsulated wireless LAN signal.

According to a eleventh aspect of the present invention, there is provided a roaming method for a wireless LAN terminal to communicate with a wireless LAN base station directly or via another wireless LAN terminal, comprising the steps of: making inquiries by sending a hierarchy inquiry to said another wireless LAN terminal and, if possible, to the wireless LAN base station; and roaming from said another wireless LAN terminal to the wireless LAN base station when it is detected that a hierarchy indicated by a hierarchy response from the wireless LAN base station to the hierarchy inquiry is lower than a hierarchy indicated by a hierarchy response from said another wireless LAN terminal to the hierarchy inquiry.

BRIEF DESCRIPTION OF THE DRAWINGS

FIG. 23 is a block diagram showing a configuration of a wireless LAN terminal 102E according to a fifth embodiment of the present invention.

DESCRIPTION OF THE PREFERRED EMBODIMENTS

Embodiments of the present invention will be described in detail with reference to the accompanying drawings.

First Embodiment

Figure 1:
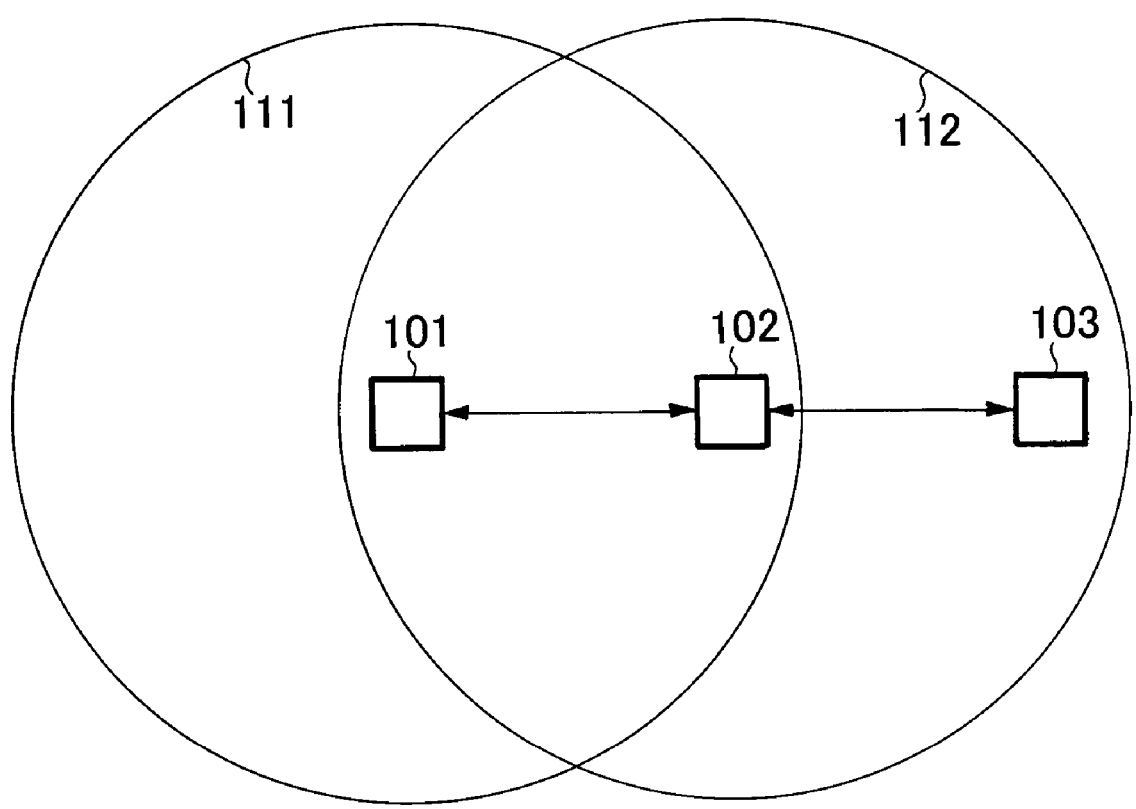
FIG. 1 is a schematic diagram showing a configuration of a wireless LAN system according to a first embodiment of the present invention.

FIG. 1 is a schematic diagram showing a configuration of a wireless LAN system according to the first embodiment of the present invention;

As shown in FIG. 1, the wireless LAN system according to the first embodiment comprises a wireless LAN base station 101, a wireless LAN terminal 102, and a wireless LAN terminal 103. The wireless LAN base station 101 can communicate with a plurality of wireless LAN terminals in a wireless LAN area 111. Accordingly, the wireless LAN base station 101 can communicate with the wireless LAN terminal 102. The wireless LAN terminal 102 can also function as a wireless LAN base station and communicate with a plurality of wireless LAN terminals in a wireless LAN area 112. Accordingly, the wireless LAN terminal 102 can communicate with the wireless LAN terminal 103. A wireless channel in the wireless LAN area 111 differ from a wireless channel in the wireless LAN area 112, avoiding a collision between wireless channels.

Figure 2:
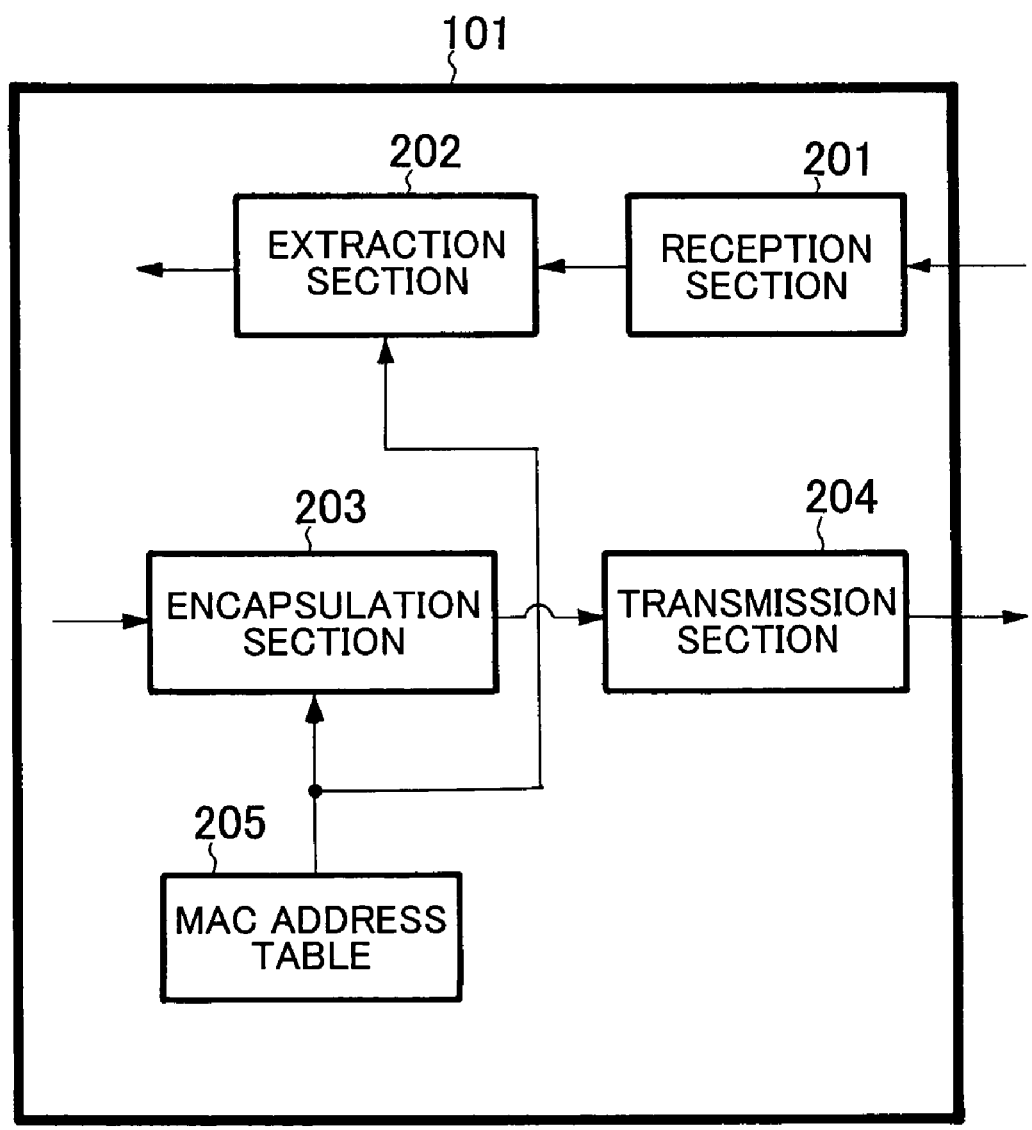
FIG. 2 is a block diagram showing a configuration of a wireless LAN base station 101 according to the first embodiment of the present invention.
Figure 3:
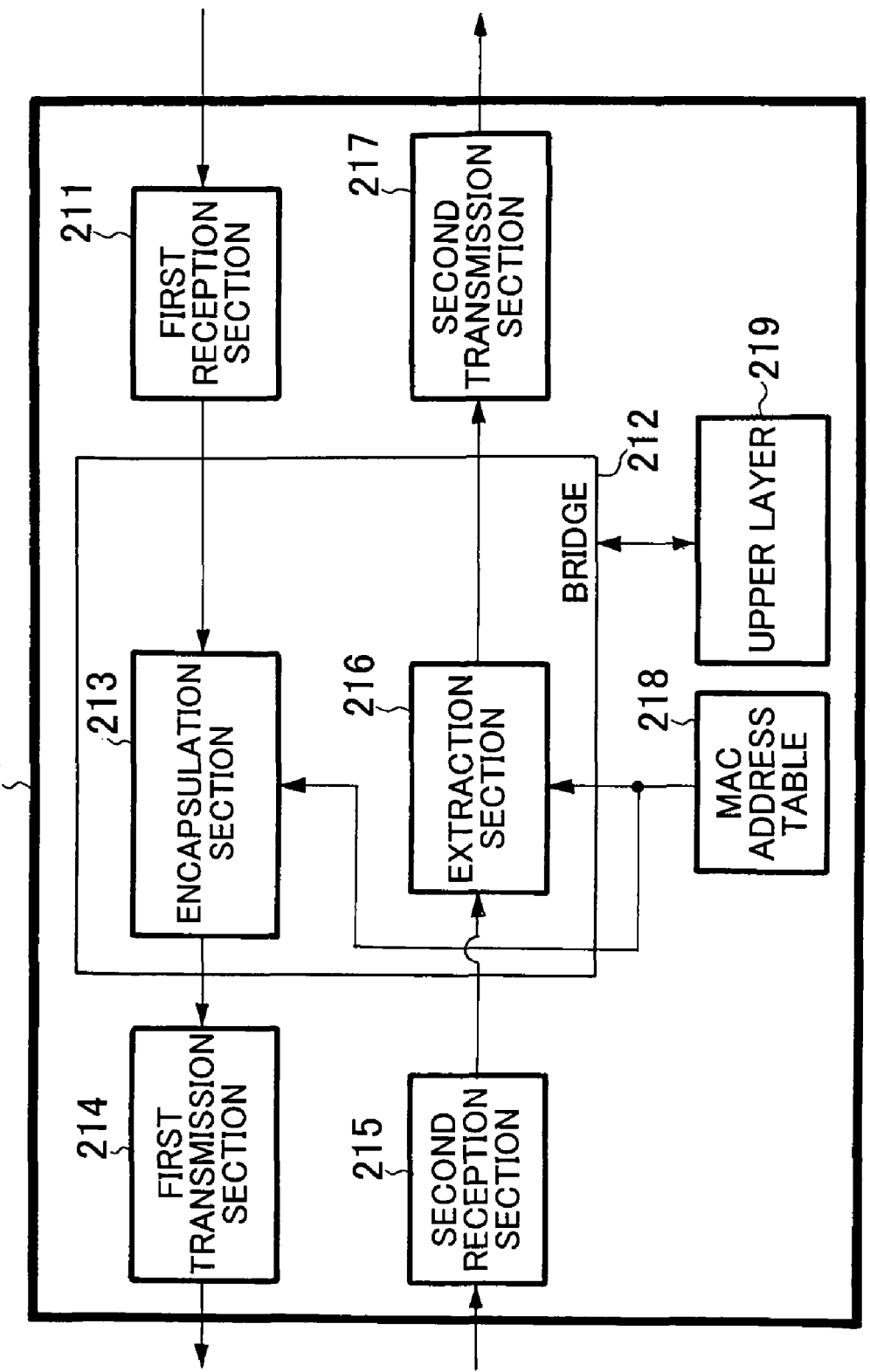
FIG. 3 is a block diagram showing a configuration of a wireless LAN terminal 102 according to the first embodiment of the present invention.
Figure 4:
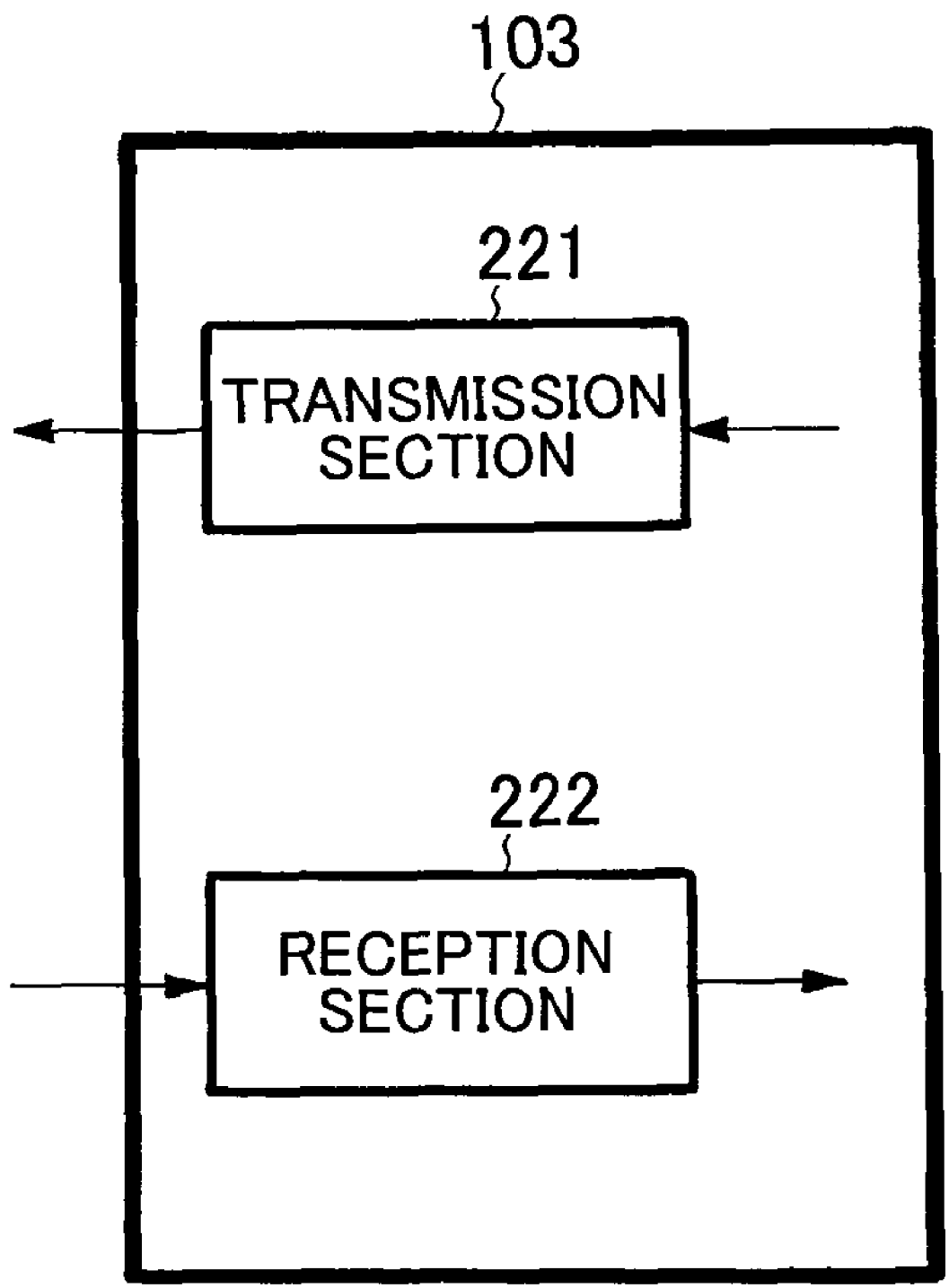
FIG. 4 is a block diagram showing a configuration of a wireless LAN terminal 103 according to the first embodiment of the present invention.

Referring now to FIGS. 2 through 4, the following describes configurations of the wireless LAN base station 101, the wireless LAN terminal 102, and the wireless LAN terminal 103. Though FIGS. 2 through 4 show only portions related to the present invention, the wireless LAN base station 101 also has conventional wireless LAN base station functions (not shown). The wireless LAN terminals 102 and 103 also have conventional wireless LAN terminal functions (not shown).

FIG. 2 is a block diagram showing a configuration of the wireless LAN base station 101. As shown in FIG. 2, the wireless LAN base station 101 comprises a reception section 201, an extraction section 202, an encapsulation section 203, a transmission section 204, and a MAC address table 205. The reception section 201 receives a wireless LAN signal from the wireless LAN terminal 102. The wireless LAN signal received from the wireless LAN terminal 102 encapsulates a wireless LAN signal from the wireless LAN terminal 103. The extraction section 202 extracts this encapsulated signal from the wireless LAN signal received from the wireless LAN terminal 102. The encapsulation section 203 encapsulates a wireless LAN signal to be returned to the wireless LAN terminal 103 in a wireless LAN signal to be transmitted to the wireless LAN terminal 102. The transmission section 204 transmits the wireless LAN signal encapsulating another wireless LAN signal to be transmitted to the wireless LAN terminal 103 to the wireless LAN terminal 102. The MAC address table 205 is configured as follows:

| First column | Second column |
| --- | --- |
| MAC address of the wireless LAN terminal 102 | Null value |
| MAC address of another wireless LAN terminal directly connected to the wireless LAN base station | Null value |
| MAC address of the wireless LAN terminal 103 | MAC address of the wireless LAN terminal 102 |
| MAC address of another wireless LAN terminal indirectly connected to the wireless LAN base station | MAC address of an intervenient wireless LAN terminal |

When the wireless LAN terminal is directly connected to the wireless LAN base station 101, the MAC address table stores a set of the MAC address for the wireless LAN terminal and a null value (e.g., "0"). When the wireless LAN terminal is indirectly connected to the wireless LAN base station 101, the MAC address table stores a set of the MAC address of that wireless LAN terminal and the MAC address of an intervenient wireless LAN terminal on the connection. Therefore, since the wireless LAN terminal 102 is directly connected to the wireless LAN base station 101, the MAC address table stores a set of the MAC address of the wireless LAN terminal 102 and the null value. Since the wireless LAN terminal 103 is connected to the wireless LAN base station 101 via the wireless LAN terminal 102, the MAC address table stores a set of the MAC address of the wireless LAN terminal 103 and the MAC address of the wireless LAN terminal 102.

Figure 7:
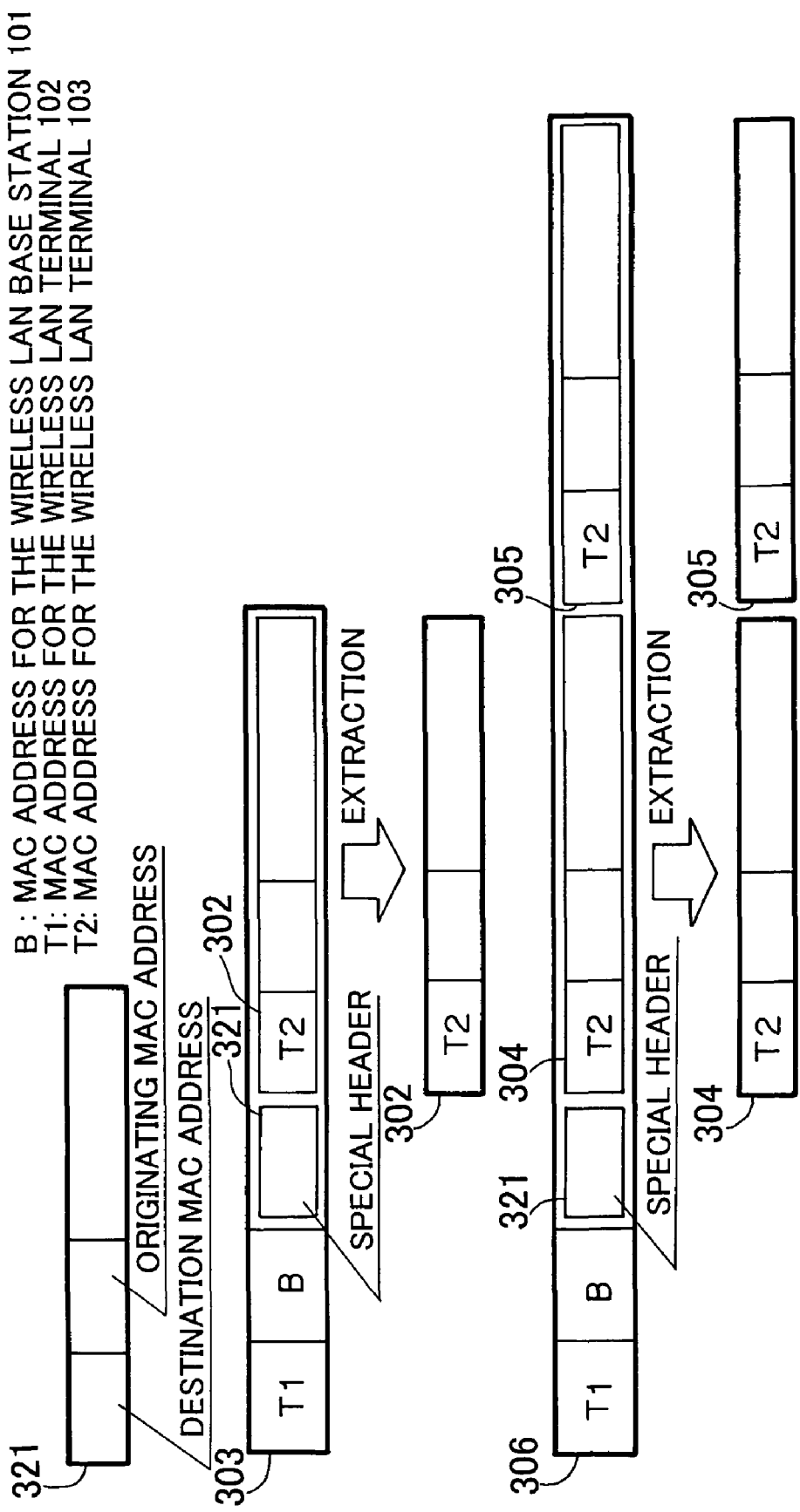
FIG. 7 is a first format diagram for explaining wireless LAN signal extraction performed by an extraction section 216 according to the first embodiment of the present invention.

By determining whether or not a special header is prefixed to the beginning of the payload of OSI layer 2 associated with the wireless LAN signal received by the reception section 201, the extraction section 202 can determine whether or not the wireless LAN signal contains the encapsulated wireless LAN signal from the wireless LAN terminal 103. The special header, as represented by the reference numeral 321 in FIG. 7, is any header other than standard headers such as those used for IP (Internet Protocol) packets, ICMP (Internet Control Message Protocol) packets, ARP (Address Resolution Protocol) packets, and the like. When it is determined that the special header is provided, the extraction section 202 determines that the wireless LAN signal contains the encapsulated wireless LAN signal from the wireless LAN terminal 103, and then extracts the encapsulated wireless LAN signal. When it is determined that no special header is provided, the extraction section 202 outputs the wireless LAN signal as is.

The encapsulation section 203 searches the MAC address table 205 for a record that contains the MAC address for the first column represented as a destination MAC address in the header of the wireless LAN signal to be transmitted from the transmission section 204. By determining whether or not the second column for that record contains the null value, the encapsulation section 203 can determine whether or not to encapsulate the wireless LAN signal to be transmitted from the transmission section 204. When it is determined that the second column for the record does not contain the null value, the encapsulation section 203 determines to encapsulate the wireless LAN signal to be transmitted from the transmission section 204, and then encapsulates that wireless LAN signal. When it is determined that the second column for the record contains the null value, the encapsulation section 203 outputs the wireless LAN signal to be transmitted from the transmission section 204 as is.

The wireless LAN terminal 103 transmits its own MAC address when transmitting a belonging request to a wireless LAN base station function section of the wireless LAN terminal 102. Then, the wireless LAN terminal 102 stores the MAC address of the wireless LAN terminal 103 in a MAC address table 218 (FIG. 3), and transfers a set of the MAC address of the wireless LAN terminal 103 and the MAC address of the wireless LAN terminal 102 itself to the wireless LAN base station 101. The wireless LAN base station 101 assumes the MAC address of the wireless LAN terminal 103 to be the first column and the MAC address of the wireless LAN terminal 102 to be the second column, and then stores the record in the MAC address table 205.

FIG. 3 is a block diagram showing a configuration of a wireless LAN terminal 102. As shown in FIG. 3, the wireless LAN terminal 102 comprises: a first reception section 211; the encapsulation section 213 a first transmission section 214; a second reception section 215; an extraction section 216; a second transmission section 217; and the MAC address table 218. The MAC address table 218 is configured as follows and stores MAC addresses of all wireless LAN terminals wirelessly connected to the wireless LAN base station function section of the wireless LAN terminal 102, i.e., a first reception 211 and a second transmission 217.

| MAC address of the wireless LAN terminal 103 |
| --- |
| MAC address of another wireless LAN terminal connected to the wireless LAN terminal 102 |

A bridge 212 includes the encapsulation section 213 and the extraction section 216. The bridge 212 is connected to an upper layer 219 for its own terminal 102. The first reception section 211 receives a wireless LAN signal from the wireless LAN terminal 103. The encapsulation section 213 encapsulates the wireless LAN signal received from the wireless LAN terminal 103 to generate a new wireless LAN signal. The encapsulation section 213 references the MAC address table 218 to determine whether or not to encapsulate the wireless LAN signal to be transmitted. If the MAC address table 218 stores the originating MAC address of the wireless LAN signal to be transmitted, the encapsulation section 213 encapsulates that wireless LAN signal. Otherwise, i.e., if the wireless LAN signal is received from the upper layer 219, the encapsulation section 213 does not encapsulate the wireless LAN signal. The first transmission section 214 transmits the wireless LAN signal output from the encapsulation section 213 to the wireless LAN base station 101. The second reception section 215 receives a wireless LAN signal from the wireless LAN base station 101. By determining whether or not the special header is prefixed to the beginning of the payload of OSI layer 2 associated with the wireless LAN signal received by the second reception section 215, the extraction section 216 can determine whether or not the wireless LAN signal contains an encapsulated wireless LAN signal destined for the wireless LAN terminal 103. When it is determined that the special header is provided, the extraction section 216 determines that the wireless LAN signal contains the encapsulated wireless LAN signal destined for the wireless LAN terminal 103, and extracts the encapsulated wireless LAN signal. When it is determined that no special header is provided, the extraction section 216 outputs the wireless LAN signal as is, and supplies it to the upper layer 219.

The second transmission section 217 transmits to the wireless LAN terminal 103 the wireless LAN signal that is extracted by the extraction section 216 and is destined for the wireless LAN terminal 103. The MAC address table 218 maintains MAC addresses of wireless LAN terminals, such as the wireless LAN terminal 103, connected to the wireless LAN base station 101 via the wireless LAN terminal 102.

The wireless LAN terminal 103 transmits its own MAC address when transmitting a belonging request to the wireless LAN base station function section of the wireless LAN terminal 102, i.e., the section including the fist reception 211 and the second transmission section 217.

FIG. 4 is a block diagram showing a configuration of the wireless LAN terminal 103. The wireless LAN terminal 103 comprises a transmission section 221 and a reception section 222. The transmission section 221 transmits a wireless LAN signal to the wireless LAN terminal 102. The reception section 222 receives a wireless LAN signal from the wireless LAN terminal 102. The transmission section 221 and the reception section 222 are connected to an upper layer (not shown).

Figure 5:
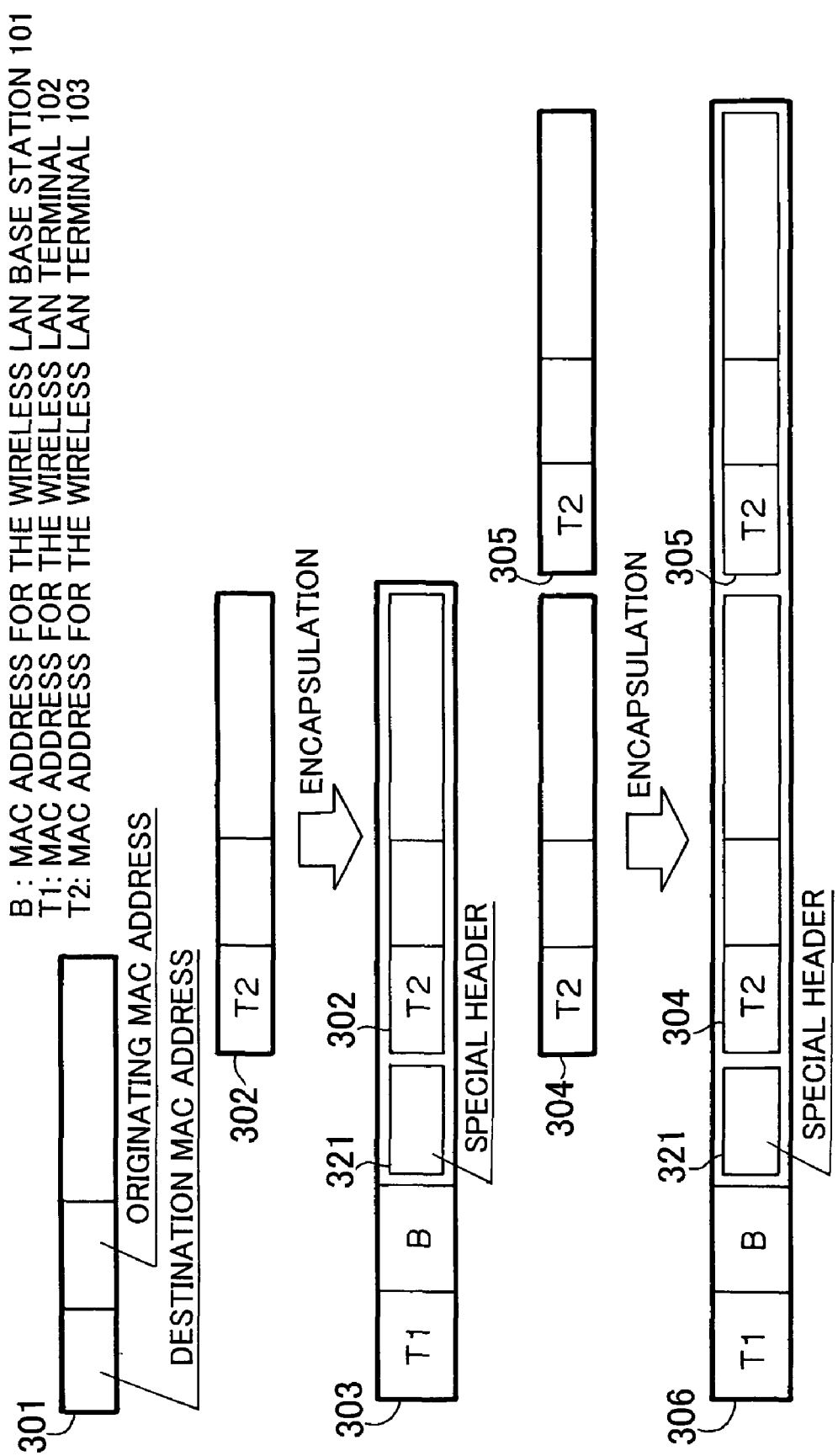
FIG. 5 is a first format diagram for explaining encapsulation performed by an encapsulation section 203 according to the first embodiment of the present invention.
Figure 6:
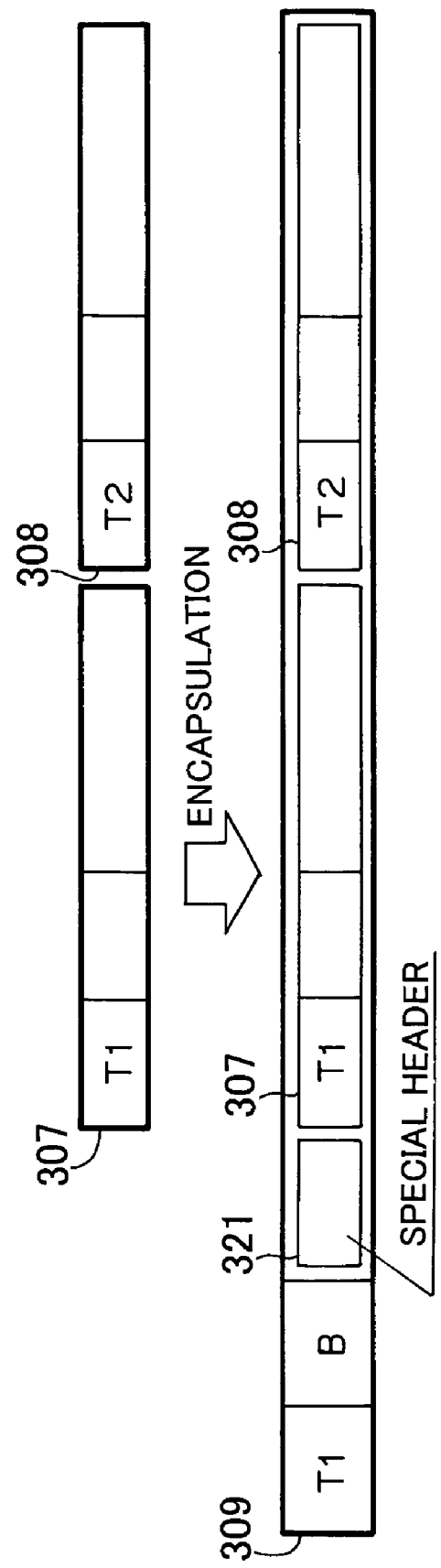
FIG. 6 is a second format diagram for explaining encapsulation performed by an encapsulation section 203 according to the first embodiment of the present invention.

With reference to FIGS. 5 and 6, the following describes encapsulation performed by the encapsulation section 203 of the wireless LAN base station 101. As shown in FIG. 5, the header of a wireless LAN signal 301 generally describes an originating MAC address and a destination MAC address. When supplied with a wireless LAN signal 302 whose destination MAC address indicates the wireless LAN terminal 103, the encapsulation section 203 provides that signal with the MAC address of the wireless LAN terminal 102 as the destination MAC address, the MAC address of the wireless LAN base station 101 as the originating MAC address, and a special header 321 to encapsulate the wireless LAN signal 302 and generate a wireless LAN signal 303. The encapsulation section 203 may provide a plurality of wireless LAN signals 304 and 305 destined for the wireless LAN terminal 103 with the MAC address of the wireless LAN terminal 102 as the destination MAC address, the MAC address of the wireless LAN base station 101 as the originating MAC address, and the special header 321 to encapsulate the wireless LAN signals 304 and 305 and generate a wireless LAN signal 306. Further, the encapsulation section 203 may provide a set of a wireless LAN signal 307 destined for the wireless LAN terminal 102 and a wireless LAN signal 308 destined for the wireless LAN terminal 103 with the MAC address of the wireless LAN terminal 102 as the destination MAC address, the MAC address of the wireless LAN base station 101 as the originating MAC address, and the special header 321 to encapsulate the wireless LAN signals 307 and 308 and generate a wireless LAN signal 309.

Figure 8:
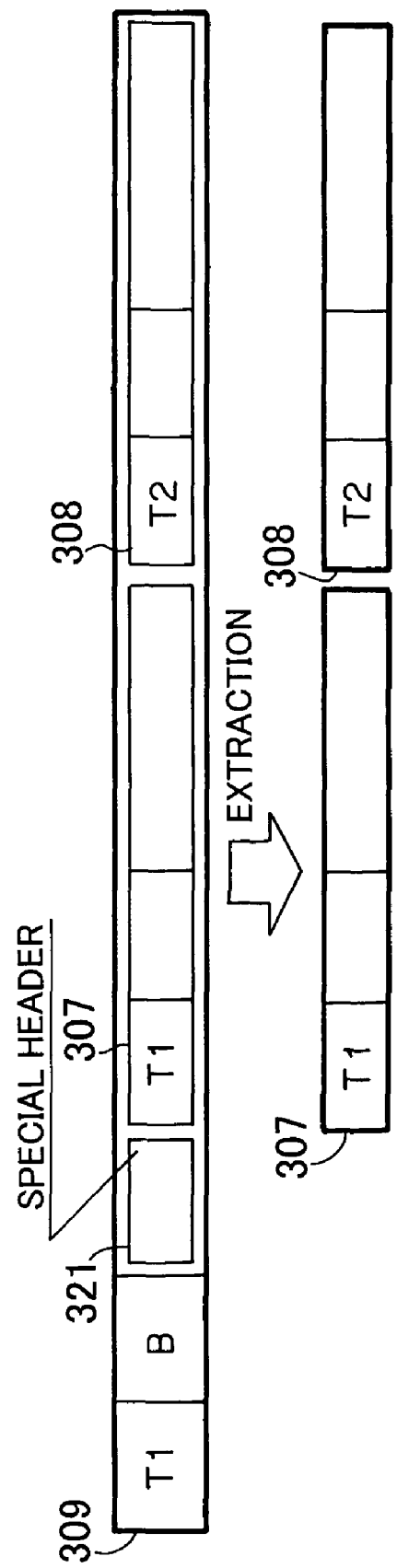
FIG. 8 is a second format diagram for explaining wireless LAN signal extraction performed by an extraction section 216 according to the first embodiment of the present invention.

Referring now to FIGS. 7 and 8, the following describes wireless LAN signal extraction performed by the extraction section 216 of the wireless LAN terminal 102. When supplied with the wireless LAN signal 303 that encapsulates the wireless LAN signal 302 destined for the wireless LAN terminal 103, the extraction section 216 extracts the wireless LAN signal 302 from the wireless LAN signal 303. When supplied with the wireless LAN signal 306 that encapsulates a plurality of wireless LAN signals 304 and 305 destined for the wireless LAN terminal 103, the extraction section 216 extracts the wireless LAN signals 304 and 305 from the wireless LAN signal 306. Further, when supplied with the wireless LAN signal 309 that encapsulates a plurality of wireless LAN signals (the wireless LAN signal 307 destined for the wireless LAN terminal 102 and the wireless LAN signal 308 destined for the wireless LAN terminal 103), the extraction section 216 extracts the wireless LAN signal 307 and 308 from the wireless LAN signal 309.

Figure 9:
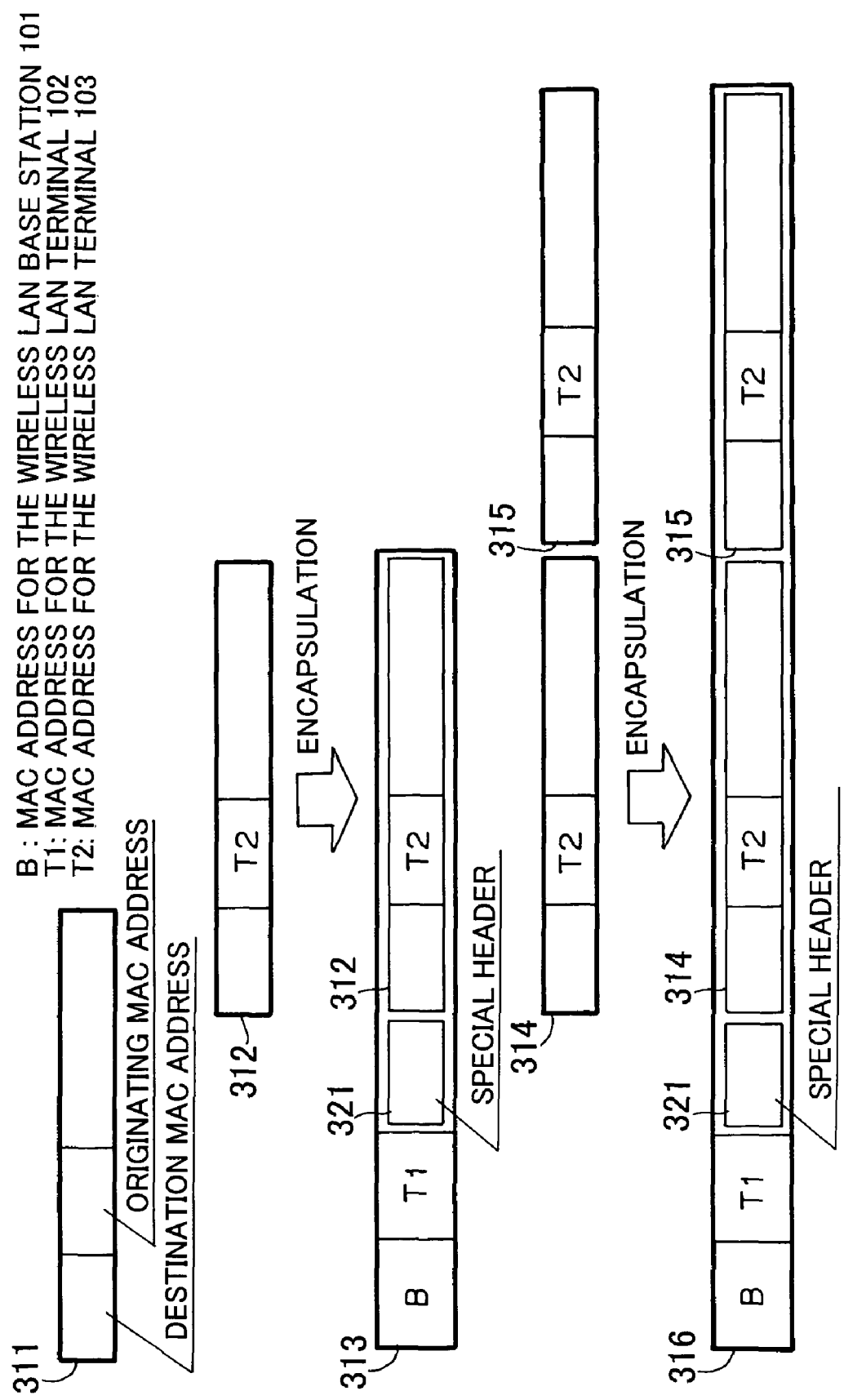
FIG. 9 is a first format diagram for explaining encapsulation performed by an encapsulation section 213 according to the first embodiment of the present invention.
Figure 10:
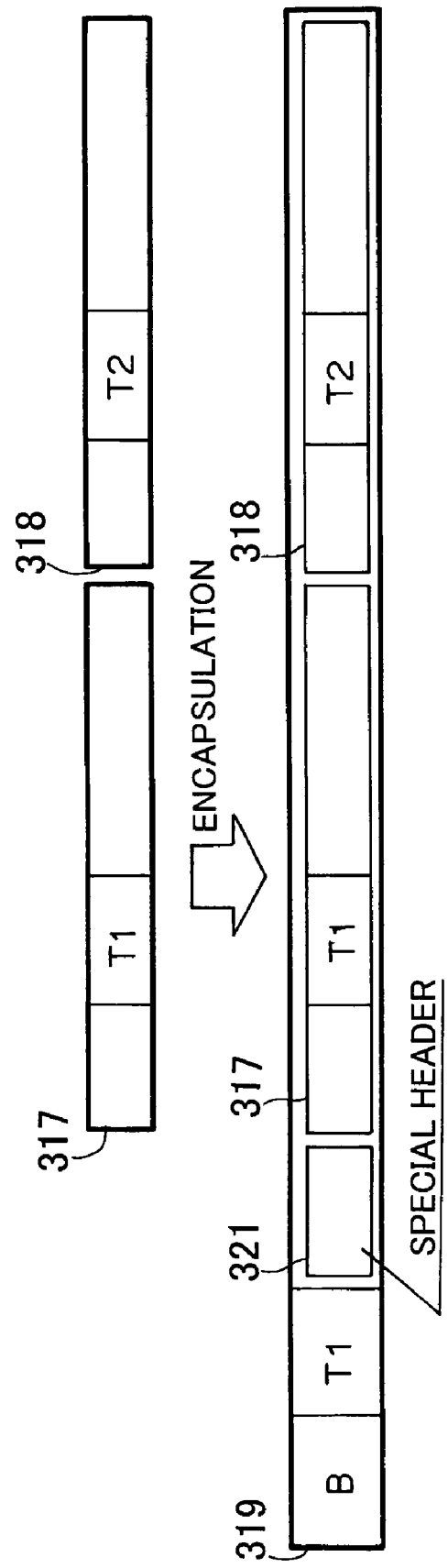
FIG. 10 is a second format diagram for explaining encapsulation performed by the encapsulation section 213 according to the first embodiment of the present invention.

With reference to FIGS. 9 and 10, the following describes encapsulation performed by the encapsulation section 213 of the wireless LAN base station 101. When supplied with a wireless LAN signal 312 whose destination origin indicates the wireless LAN terminal 103, the encapsulation section 213 provides that signal with the MAC address of the wireless LAN base station 101 as the destination MAC address, the MAC address of the wireless LAN terminal 102 as the originating MAC address, and the special header 321 to encapsulate the wireless LAN signal 312 and generate a wireless LAN signal 313. The encapsulation section 213 may provide a plurality of wireless LAN signals 314 and 315 transmitted from the wireless LAN terminal 103 with the MAC address of the wireless LAN base station 101 as the destination MAC address, the MAC address of the wireless LAN terminal 102 as the originating MAC address, and the special header 321 to encapsulate the wireless LAN signals 314 and 315 and generate a wireless LAN signal 316. Further, the encapsulation section 213 may provide a set of a wireless LAN signal 317 transmitted from the wireless LAN terminal 102 and a wireless LAN signal 318 transmitted from the wireless LAN terminal 103 with the MAC address of the wireless LAN base station 101 as the destination MAC address, the MAC address of the wireless LAN terminal 102 as the transmission origin MAC address, and the special header 321 to encapsulate the wireless LAN signals 317 and 318 and generate a wireless LAN signal 319.

Figure 11:
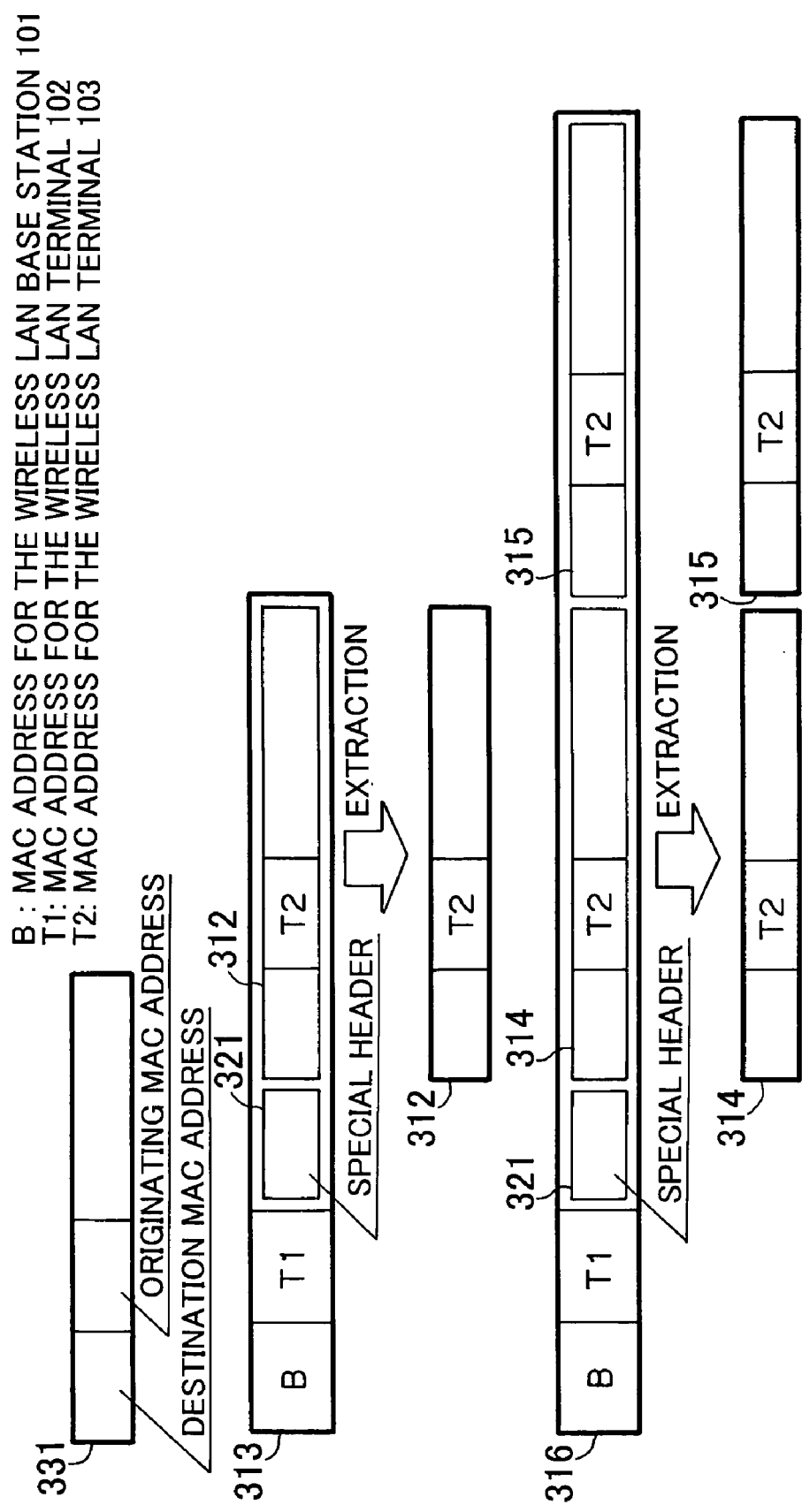
FIG. 11 is a first format diagram for explaining wireless LAN signal extraction performed by an extraction section 202 according to the first embodiment of the present invention.
Figure 12:
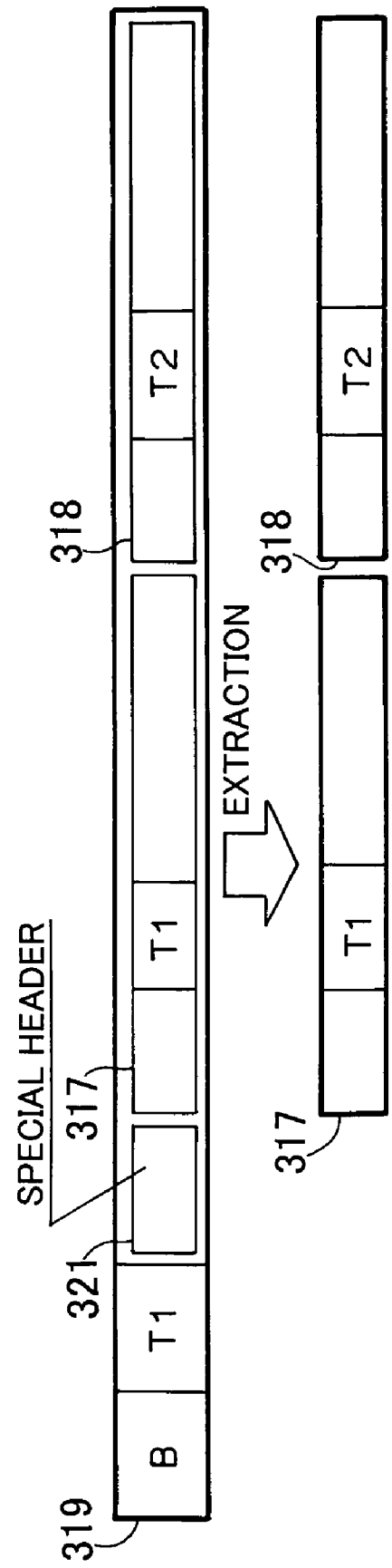
FIG. 12 is a second format diagram for explaining wireless LAN signal extraction performed by the extraction section 202 according to the first embodiment of the present invention.

Referring now to FIGS. 11 and 12, the following describes wireless LAN signal extraction performed by the extraction section 202 of the wireless LAN base station 101. When supplied with the wireless LAN signal 313 that encapsulates the wireless LAN signal 312 transmitted from the wireless LAN terminal 103, the extraction section 216 extracts the wireless LAN signal 312 from the wireless LAN signal 313. When supplied with the wireless LAN signal 316 that encapsulates a plurality of wireless LAN signals 314 and 315 transmitted from the wireless LAN terminal 103, the extraction section 202 extracts the wireless LAN signals 314 and 315 from the wireless LAN signal 316. Further, when supplied with the wireless LAN signal 319 that encapsulates a plurality of wireless LAN signals (the wireless LAN signal 317 transmitted from the wireless LAN terminal 102 and the wireless LAN signal 318 transmitted from the wireless LAN terminal 103), the extraction section 202 extracts the wireless LAN signal 317 and 318 from the wireless LAN signal 319.

Second Embodiment

According to the first embodiment, the wireless LAN terminal 102 comprises two transmission sections (the first transmission section 214 and the second transmission section 217) and two reception sections (the first reception section 211 and the second reception section 215), thus increasing the circuit scale compared to ordinary wireless LAN terminals. The second embodiment uses one transmission section and one reception section for the wireless LAN terminal according to the present invention.

Figure 13:
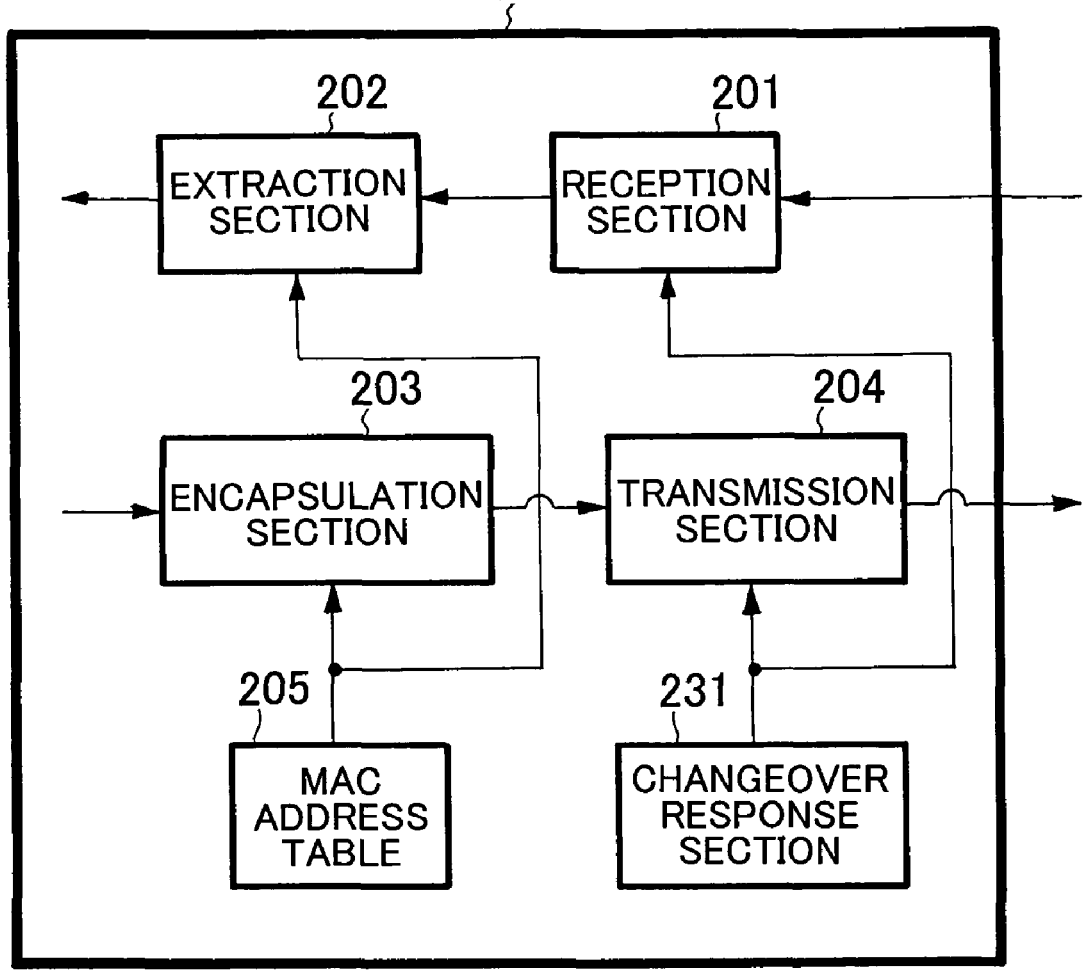
FIG. 13 is a block diagram showing a configuration of a wireless LAN base station 101B according to a second embodiment of the present invention.

FIG. 13 is a block diagram showing a configuration of a wireless LAN base station 101B according to the second embodiment. As clearly understood from the comparison between FIGS. 2 and 13, the wireless LAN base station 101B according to the second embodiment differs from the wireless LAN base station 101 according to the first embodiment in addition of a changeover response section 231. The changeover response section 231 functions as follows. The wireless LAN base station 101B returns responses to a base station transition notification and terminal transition notification received from the wireless LAN terminal 102B according to the second embodiment. From the time of returning an acknowledgement to the base station transition notification to the time of returning an acknowledgement to the terminal transition notification, the changeover response section 231 prevents the reception section 201 from receiving a wireless LAN signal from the wireless LAN terminal 102B and prevents the transmission section 204 from transmitting a wireless signal to the wireless LAN terminal 102B.

Figure 14:
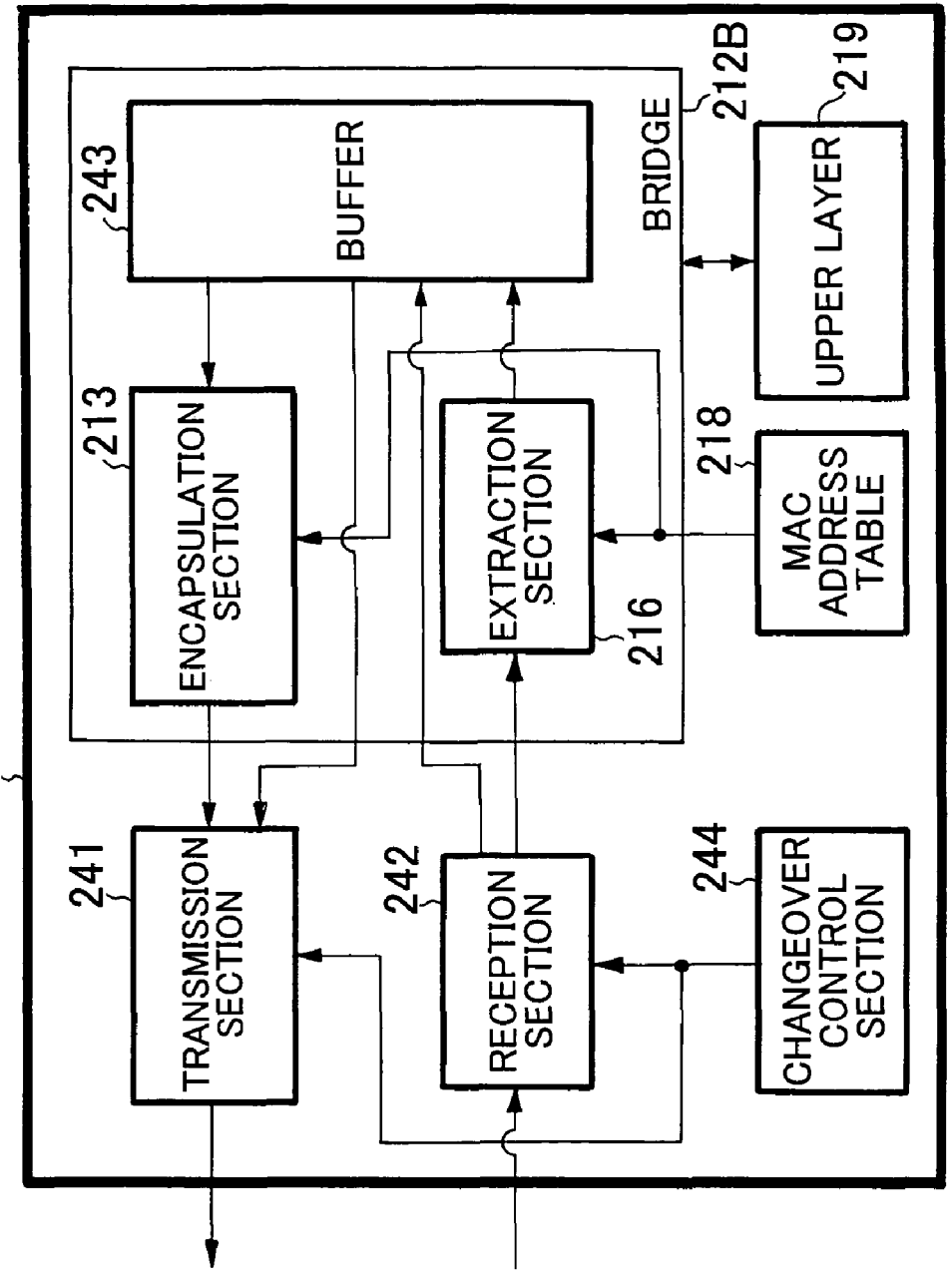
FIG. 14 is a block diagram showing a configuration of a wireless LAN terminal 102B according to the second embodiment of the present invention.

FIG. 14 is a block diagram showing a configuration of a wireless LAN terminal 102B according to the second embodiment. As clearly understood from the comparison between FIGS. 3 and 14, the wireless LAN terminal 102B according to the second embodiment differs from the wireless LAN terminal 102 according to the first embodiment in the following. The bridge 212 is changed to a bridge 212B. A changeover control section 244 is added. The first transmission section 214 and the second transmission section 217 are unified into a transmission section 241. The first reception section 211 and the second reception section 215 are unified into a reception section 242.

The changeover control section 244 receives an acknowledgement to the base station transition notification from the wireless LAN base station 101B, and then receives an acknowledgement to the terminal transition notification from the wireless LAN base station 101B. During this period, the transmission section 241 transmits a wireless LAN signal to the wireless LAN terminal 103. Also during this period, the reception section 242 receives a wireless LAN signal from the wireless LAN terminal 103. During the period, the transmission section 241 transmits wireless LAN signals that were received from the wireless LAN base station 101B and have been temporarily stored in a buffer 243. During the period, the buffer 243 temporarily stores wireless LAN signals received from the wireless LAN terminal 103 by the reception section 242.

The changeover control section 244 receives an acknowledgement to the terminal transition notification from the wireless LAN base station 101B, and then receives an acknowledgement to the base station transition notification from the wireless LAN base station 101B. During this period, the transmission section 241 transmits a wireless LAN signal to the wireless LAN base station 101B. Also during this period, the reception section 242 receives a wireless LAN signal from the wireless LAN base station 101B. During the period, the transmission section 241 transmits wireless LAN signals containing wireless LAN signals that were received from the wireless LAN terminal 103 and have been temporarily stored in a buffer 243. During the period, the buffer 243 temporarily stores wireless LAN signals that are received by the reception section 242 and are destined for the wireless LAN terminal 103.

Figure 15:
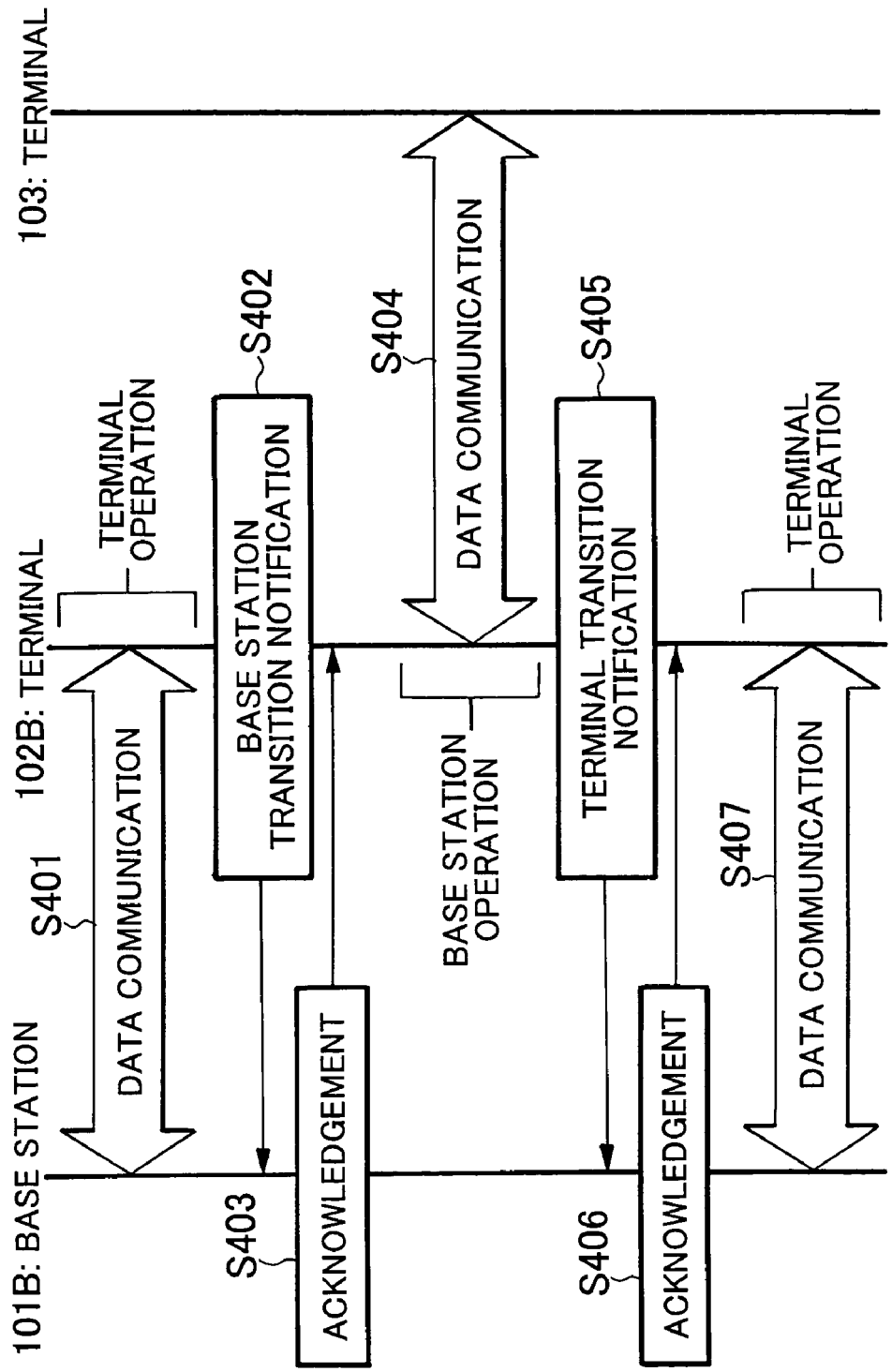
FIG. 15 is a sequence diagram for explaining operations according to the second embodiment of the present invention.

Referring now to FIG. 15, operations of the second embodiment will be described.

When operating as a wireless LAN terminal, the wireless LAN terminal 102B sends and receives wireless LAN signals to and from the wireless LAN base station 101B. When a specified time interval has expired or the usage of the buffer 243 exceeds a specified value, the wireless LAN terminal 102B sends a base station transition notification to the wireless LAN base station 101B (step S402). At this time, the wireless LAN base station 101B returns an acknowledgement to the wireless LAN terminal 102B (step S403). When receiving the acknowledgement to the base station transition notification, the wireless LAN terminal 102B operates as a wireless LAN base station. The wireless LAN terminal 102B sends and receives wireless LAN signals to and from the wireless LAN terminal 103 (step S404). When a specified time interval has expired or the usage of the buffer 243 exceeds a specified value, the wireless LAN terminal 102B sends a terminal transition notification to the wireless LAN base station 101B (step S405). At this time, the wireless LAN base station 101B returns an acknowledgement to the wireless LAN terminal 102B (step S406). When receiving the acknowledgement to the terminal transition notification, the wireless LAN terminal 102B operates as a wireless LAN terminal. The wireless LAN terminal 102B sends and receives wireless LAN signals to and from the wireless LAN base station 101B (step S407).

Third Embodiment

The wireless LAN terminal 103 is not included in the wireless LAN area 111. When included in the wireless LAN area 112, the wireless LAN terminal 103 communicates with the wireless LAN terminal 102. When the wireless LAN terminal 103 is moved into the wireless LAN area 111, it is preferable from the viewpoint of communication efficiency that the wireless LAN terminal 103 communicates with the wireless LAN base station 101. In this manner, the third embodiment relates to roaming for the wireless LAN terminal 103 to change communication destinations.

Figure 16:
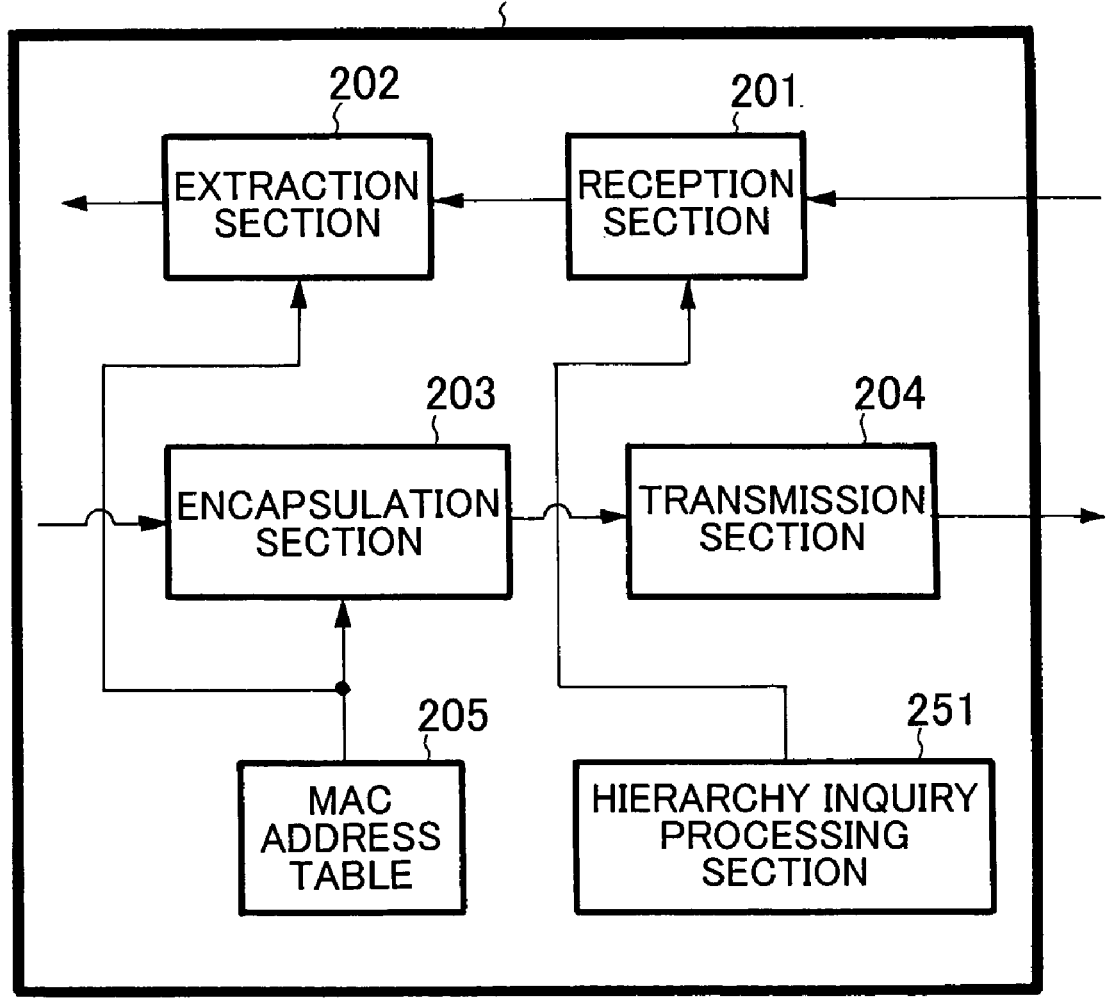
FIG. 16 is a block diagram showing a configuration of a wireless LAN base station 101C according to a third embodiment of the present invention.

FIG. 16 is a block diagram showing a configuration of a wireless LAN base station 101C according to the third embodiment. As clearly understood from the comparison between FIGS. 2 and 16, the wireless LAN base station 101C according to the third embodiment differs from the wireless LAN base station 101 according to the first embodiment in addition of a hierarchy inquiry processing section 251. When receiving a hierarchy inquiry from any wireless LAN terminal, the hierarchy inquiry processing section 251 returns a hierarchy response including the same hierarchy as that included in the hierarchy inquiry to the wireless LAN terminal.

Figure 17:
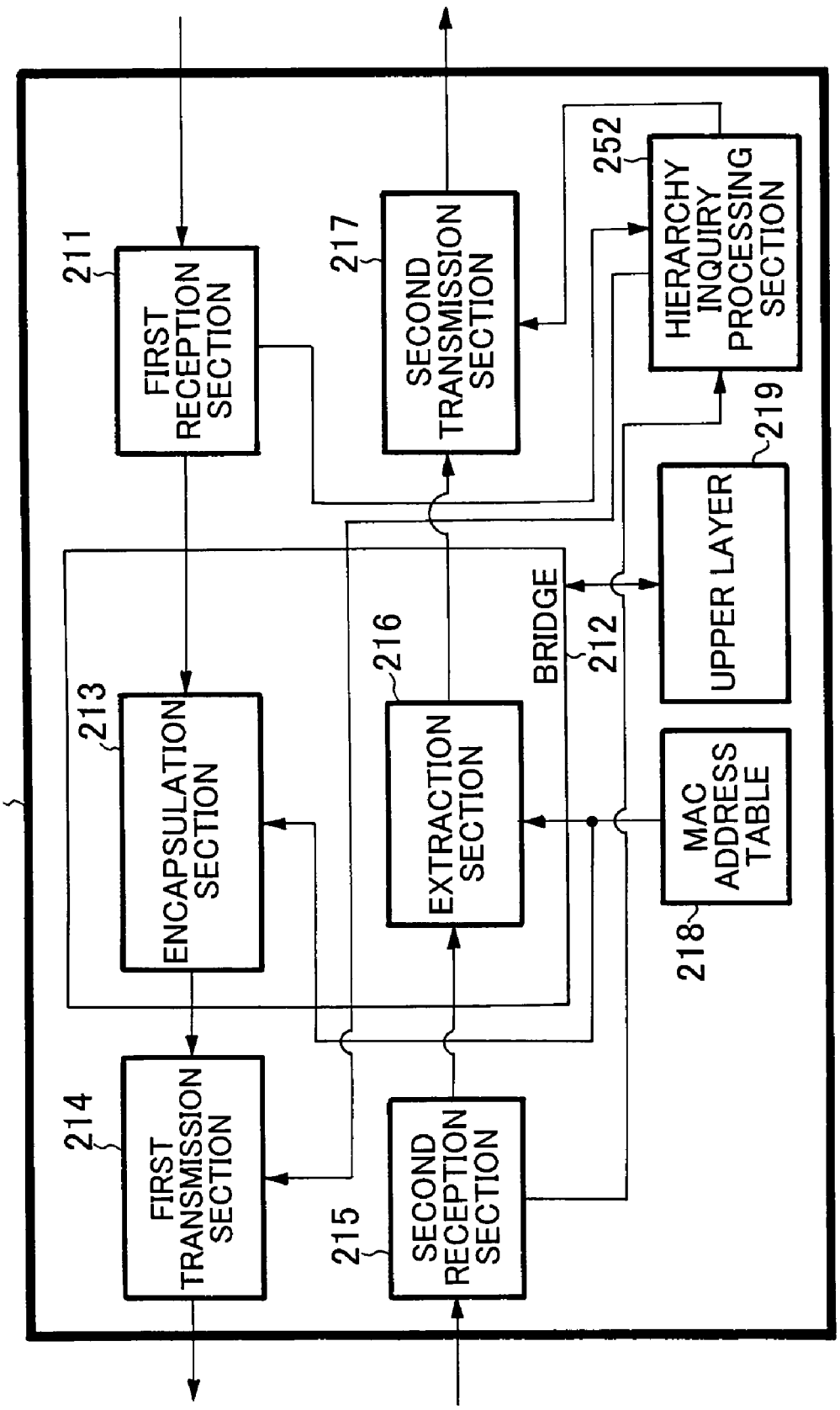
FIG. 17 is a block diagram showing a configuration of a wireless LAN terminal 102C according to the third embodiment of the present invention.

FIG. 17 is a block diagram showing a configuration of a wireless LAN terminal 102C according to the third embodiment of the present invention. As clearly understood from the comparison between FIGS. 3 and 17, the wireless LAN terminal 102C according to the third embodiment differs from the wireless LAN terminal 102 according to the first embodiment in addition of a hierarchy inquiry processing section 252. When receiving a hierarchy inquiry from the wireless LAN terminal 103C, the hierarchy inquiry processing section 252 sends a hierarchy inquiry containing a hierarchy incremented by one higher than the hierarchy contained in that hierarchy inquiry to the wireless LAN base station 101C. When receiving a hierarchy response from the wireless LAN base station 101C, the hierarchy inquiry processing section 252 returns a hierarchy response containing the same hierarchy as that contained in the hierarchy response to the wireless LAN terminal 103C.

Figure 18:
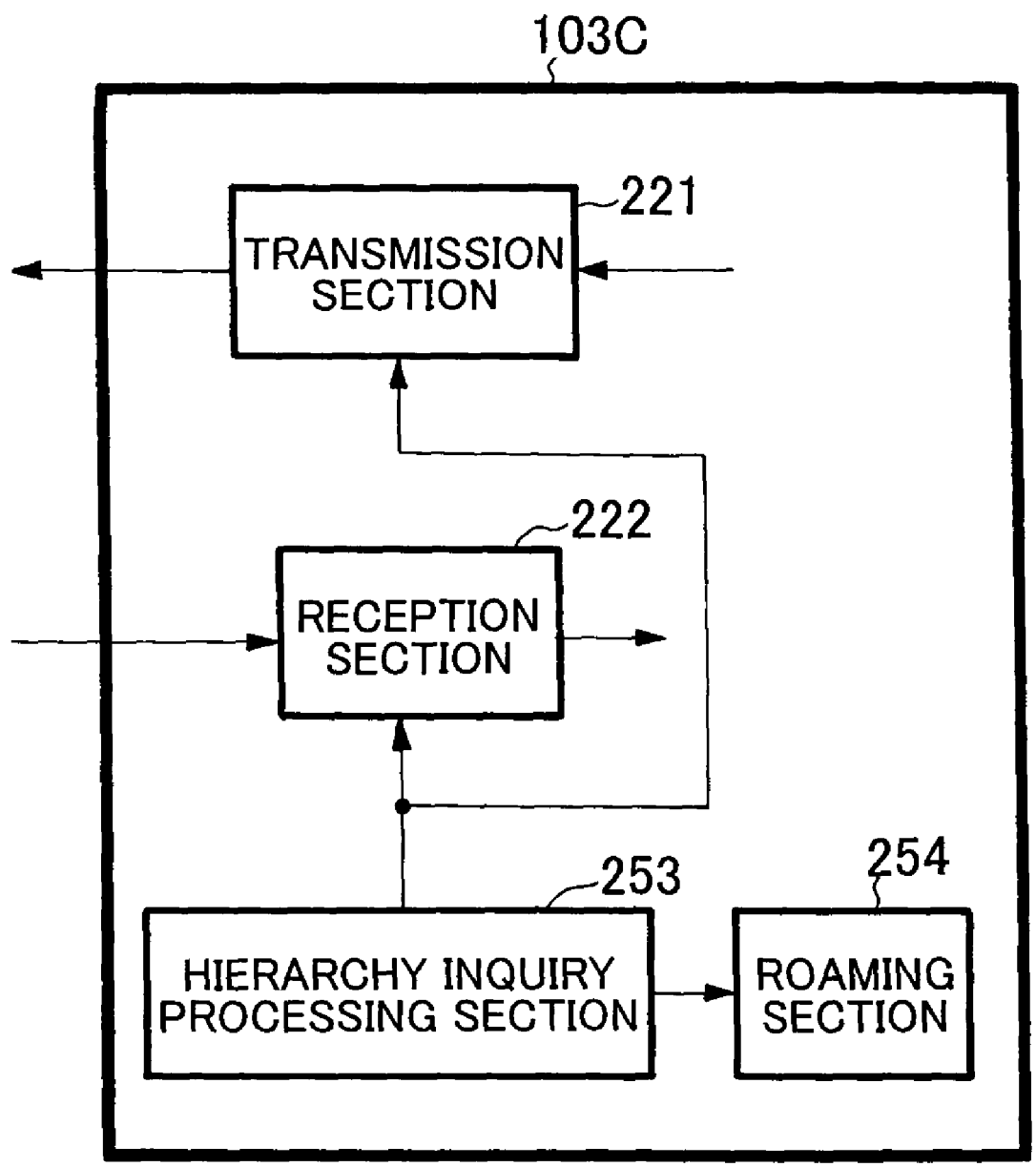
FIG. 18 is a block diagram showing a configuration of a wireless LAN terminal 103C according to the third embodiment of the present invention.

FIG. 18 is a block diagram showing a configuration of the wireless LAN terminal 103C according to the third embodiment. As clearly understood from the comparison between FIGS. 4 and 18, the wireless LAN terminal 103C according to the third embodiment differs from the wireless LAN terminal 103 according to the first embodiment in addition of a hierarchy inquiry processing section 253 and a roaming section 254. The hierarchy inquiry processing section 253 sends a hierarchy inquiry containing the lowest hierarchy to the wireless LAN base station 101C and the wireless LAN terminal 102C and receives hierarchy responses from the wireless LAN base station 101C and the wireless LAN terminal 102C. The roaming section 254 roams to an apparatus that returned a hierarchy response containing the relatively lowest hierarchy.

Figure 19:
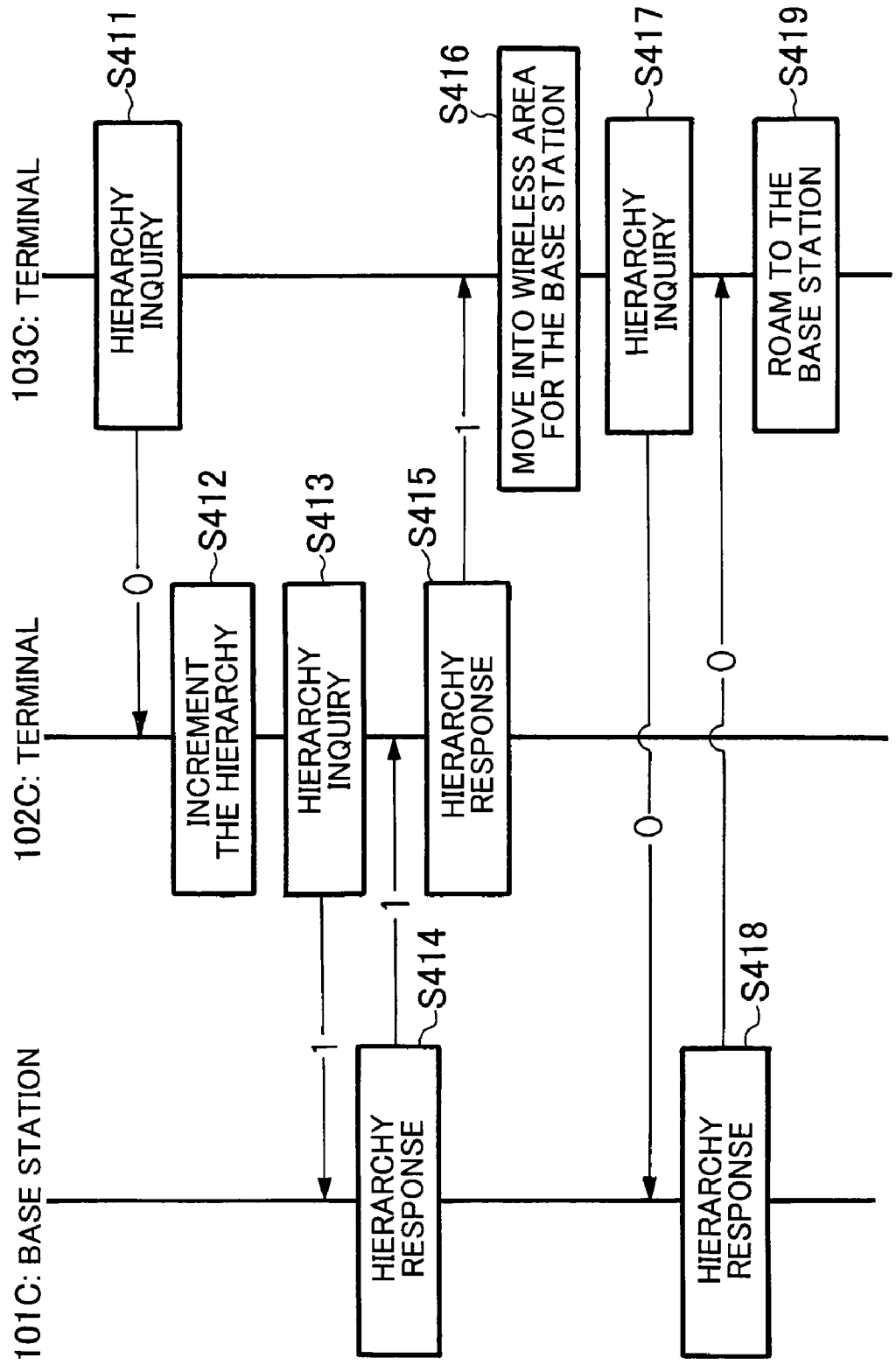
FIG. 19 is a sequence diagram for explaining operations according to the third embodiment of the present invention.

Referring now to FIG. 19, operations of the third embodiment will be described.

It is assumed that the wireless LAN terminal 103C is situated at a position that is not included in the wireless LAN area 111 but is included in the wireless LAN area 112. The wireless LAN terminal 103 sends a hierarchy inquiry containing the lowest hierarchy (hierarchy 0) to the wireless LAN terminal 102C (step S411). When receiving this hierarchy inquiry, the wireless LAN terminal 102C increments by one the hierarchy contained in the received hierarchy inquiry (step S412). The wireless LAN terminal 102C sends the hierarchy inquiry containing the hierarchy incremented by one (hierarchy 1) to the wireless LAN base station 101C (step S413). When receiving the hierarchy inquiry from the wireless LAN terminal 102C, the wireless LAN base station 101C returns a hierarchy inquiry containing the same hierarchy (hierarchy 1) as that contained in that hierarchy inquiry to the wireless LAN terminal 102C (step S414). When receiving the hierarchy response from the wireless LAN base station 101C, the wireless LAN terminal 102C returns a hierarchy response containing the same hierarchy (hierarchy 1) as that contained in that hierarchy response to the wireless LAN terminal 103C. In this manner, the wireless LAN terminal 103C communicates with the wireless LAN terminal 102C to find that the hierarchy is 1.

The wireless LAN terminal 103C then moves to the wireless LAN area 111 (step S416). The wireless LAN terminal 103C changes the wireless channel and sends a hierarchy inquiry containing the lowest hierarchy (hierarchy 0) to the wireless LAN base station 101C (step S417). When receiving the hierarchy inquiry from the wireless LAN terminal 103C, the wireless LAN base station 101C returns a hierarchy response containing the same hierarchy (hierarchy 0) as that contained in the hierarchy inquiry to the wireless LAN terminal 103C (step S418). In this manner, the wireless LAN terminal 103C communicates with the wireless LAN base station 101C to find that the hierarchy is 0.

Finally, the wireless LAN terminal 103 roams to the wireless LAN base station 101C that has the lowest hierarchy (step S419).

The third embodiment is a modification of the first embodiment. Obviously, the second embodiment can be modified in the same manner as modifying the first embodiment to the third embodiment.

Fourth Embodiment

According to the first embodiment, the wireless LAN terminal 102 enables the wireless LAN base station function independently of whether or not the wireless LAN terminal 103 exists. This leads to an uneconomical use of electric power, CPU capabilities, radio environment, and the like when the wireless LAN terminal 103 does not exist. The fourth embodiment prevents such waste.

Figure 20:
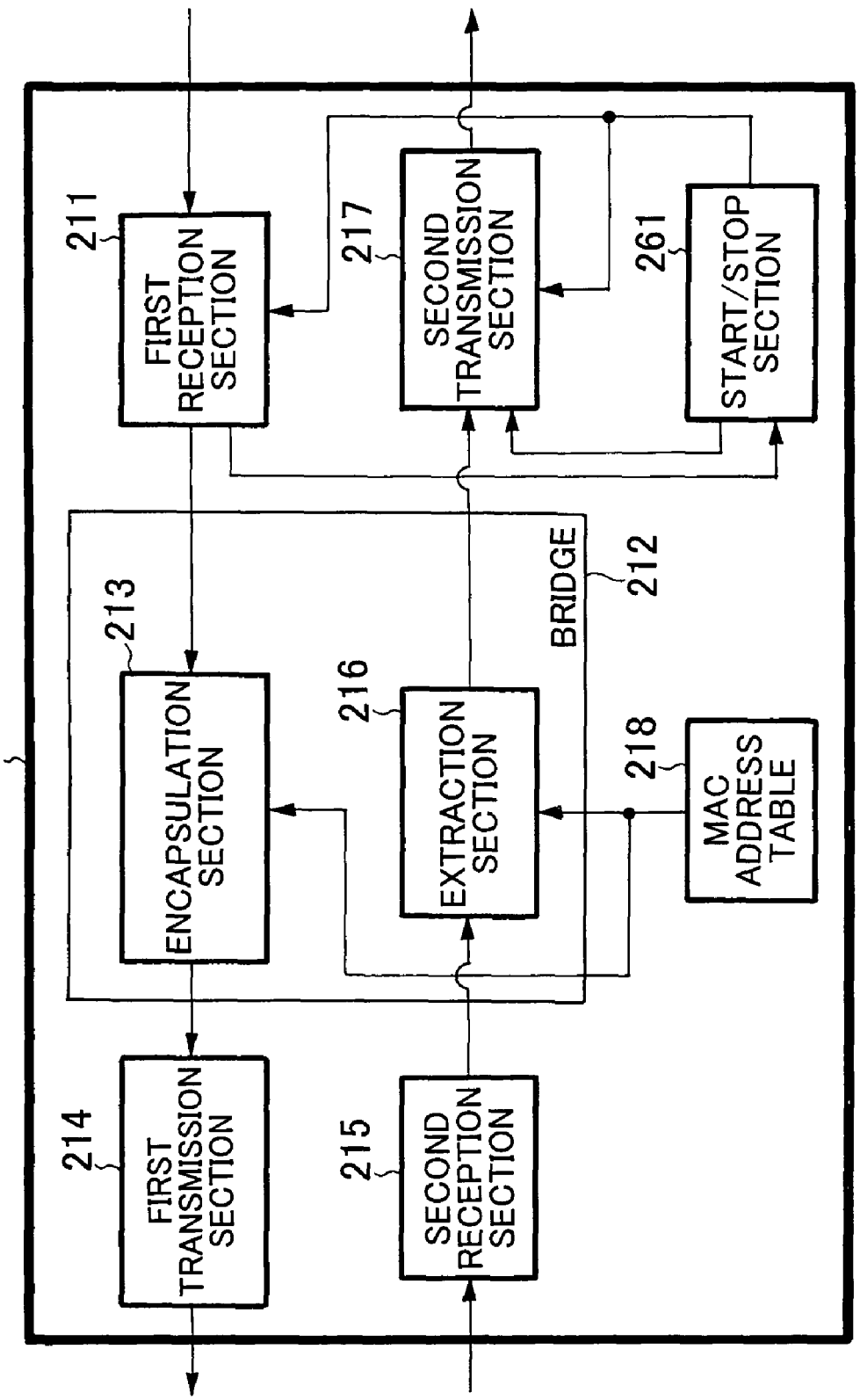
FIG. 20 is a block diagram showing a configuration of a wireless LAN terminal 102D according to a fourth embodiment of the present invention.

FIG. 20 is a block diagram showing a configuration of a wireless LAN terminal 102D according to the fourth embodiment. As clearly understood from the comparison between FIGS. 3 and 20, the wireless LAN terminal 102D according to the fourth embodiment differs from the wireless LAN terminal 102 according to the first embodiment in addition of a start/stop section 261. The start/stop section 261 determines whether or not to start the wireless LAN base station function of the wireless LAN terminal 102D in accordance with a base station function start request received from the wireless LAN terminal 103D and a state of communication with the wireless LAN terminal 103D. According to the determination, the start/stop section 261 starts or stops the first reception section 211 and the second transmission section 217.

Figure 21:
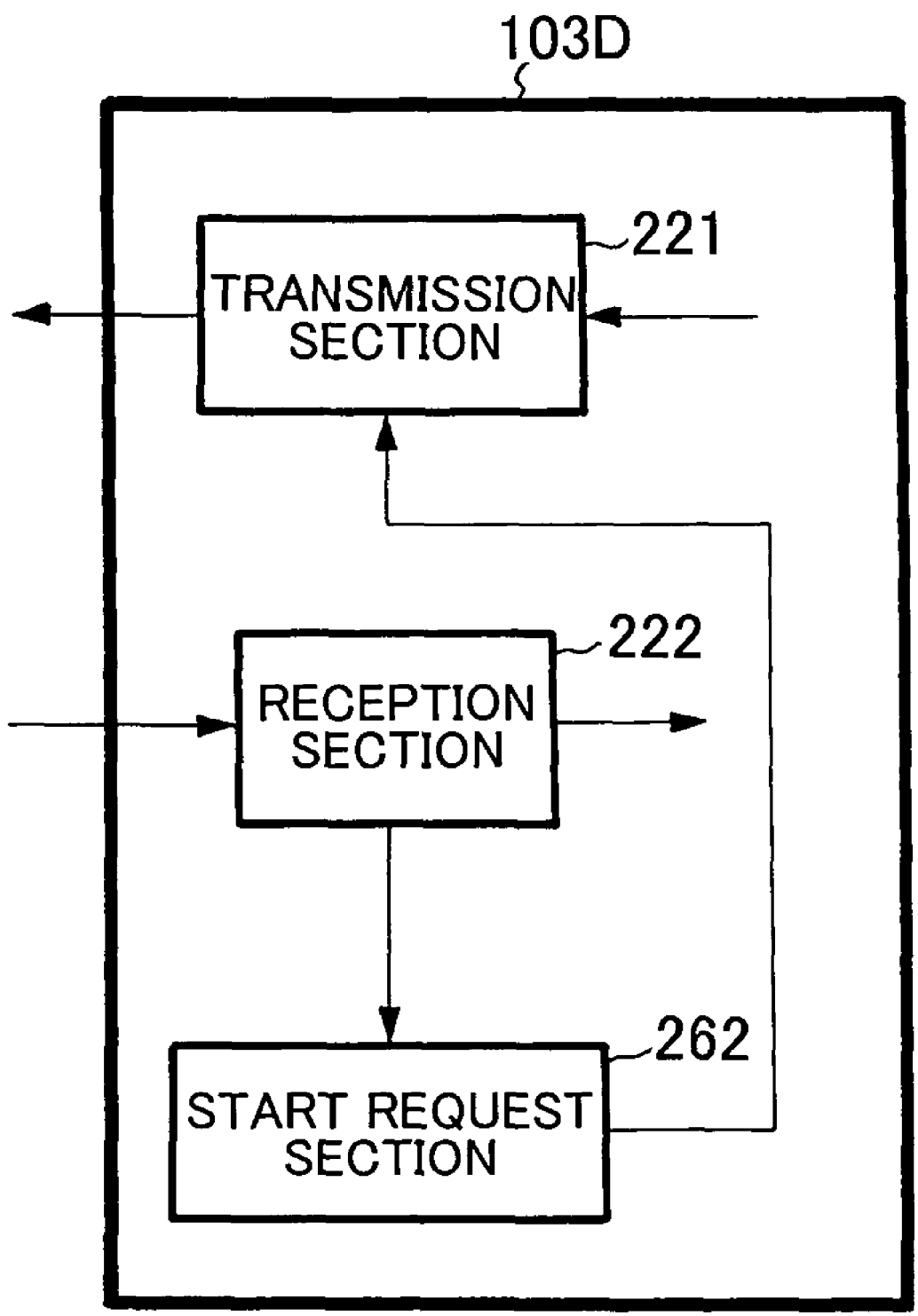
FIG. 21 is a block diagram showing a configuration of a wireless LAN terminal 103D according to the fourth embodiment of the present invention.

FIG. 21 is a block diagram showing a configuration of a wireless LAN terminal 103D according to the fourth embodiment. As clearly understood from the comparison between FIGS. 4 and 21, the wireless LAN terminal 103D according to the fourth embodiment differs from the wireless LAN terminal 103 according to the first embodiment in addition of a start request section 262. The start request section 262 detects any wireless LAN signal sent from the first transmission section 214 of the wireless LAN terminal 102D. When finding the wireless LAN terminal 102D by the detection, the start request section 262 sends a base station function start request to the wireless LAN terminal 102D.

Figure 22:
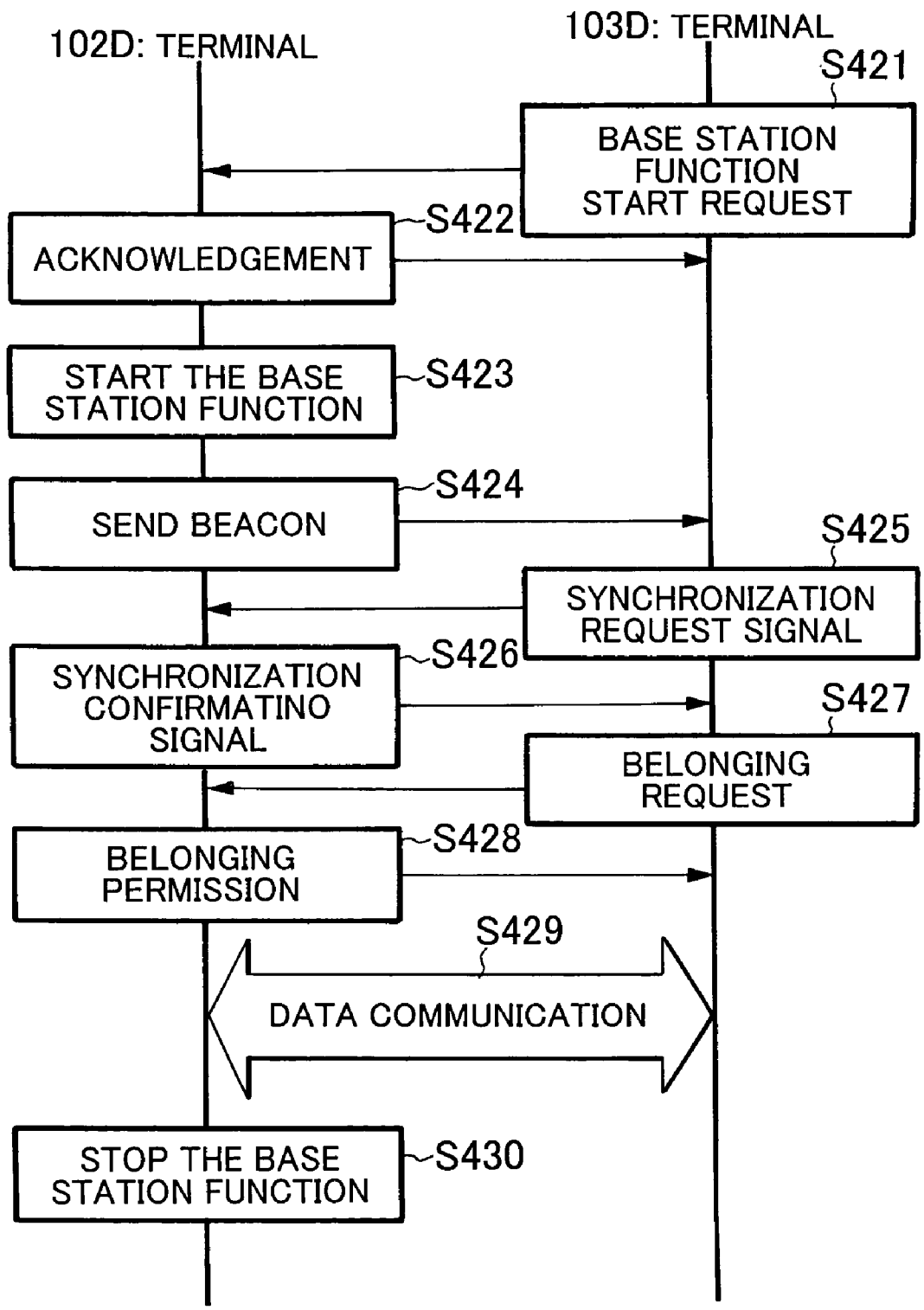
FIG. 22 is a sequence diagram for explaining operations according to the fourth embodiment of the present invention.

Referring now to FIG. 22, operations of the fourth embodiment will be described.

When finding the wireless LAN terminal 102D, the wireless LAN terminal 103D sends a base station function start request to the wireless LAN terminal 102D (step S421). The wireless LAN terminal 102D returns an acknowledgement in response to the base station function start request to the wireless LAN terminal 103 (step S422). The wireless LAN terminal 102D then starts the base station function (step S423). That is to say, the wireless LAN terminal 102D starts the first reception section 211 and the second transmission section 217. The wireless LAN terminal 102D then sends a beacon (step S424). The wireless LAN terminal 103 sends a synchronization request signal to the wireless LAN terminal 102D (step S425). The wireless LAN terminal 102D sends a synchronization confirmation signal to the wireless LAN terminal 103D (step S426). The wireless LAN terminal 103D then sends a belonging request to the wireless LAN terminal 102D (step S427). When receiving the belonging request from the wireless LAN terminal 103D, the wireless LAN terminal 102D then sends a belonging permission to the wireless LAN terminal 103D (step S428). The wireless LAN base station function section (the first reception section 211, the second transmission section 217, and the like) of the wireless LAN terminal 102D exchanges wireless LAN signals with the wireless LAN terminal 103D (step S429). When detecting no wireless LAN signal exchanged between the wireless LAN base station function section of the wireless LAN terminal 102D and the wireless LAN terminal 103D, the wireless LAN terminal 102D stops the wireless LAN base station function section (step S430).

The fourth embodiment is a modification of the first embodiment. Obviously, the third embodiment can be modified in the same manner as modifying the first embodiment to the fourth embodiment.

Fifth Embodiment

According to the first embodiment, a user needs to manually configure a wireless channel used by the first reception section 211 and the second transmission section 217 of the wireless LAN base station 102. In such case, a wireless channel in the wireless LAN area 111 may overlap with a wireless channel in the wireless LAN area 112. In order to prevent this problem, the fifth embodiment automatically configures a wireless channel.

FIG. 23 is a block diagram showing a configuration of a wireless LAN terminal 102E according to the fifth embodiment. As clearly understood from the comparison between FIGS. 3 and 23, the wireless LAN terminal 102E according to the fifth embodiment differs from the wireless LAN terminal 102 according to the first embodiment in addition of a wireless channel setup section 271. When starting a wireless LAN function section, the wireless channel setup section 271 scans wireless channels used in the circumference. The wireless channel setup section 271 allows the wireless LAN function section to use a wireless channel that least interferes with the other wireless channels used in the circumference.

Sixth Embodiment

According to embodiments 1 through 5, only the wireless LAN terminal 103 is connected to the wireless LAN base station 101 via the wireless LAN terminal 102. Further, a plurality of wireless terminals can be connected to the wireless LAN base station 101 via the wireless LAN terminal 102 without changing the configurations of the wireless LAN base station 101 and the wireless LAN terminal 102.

As mentioned above, the present invention makes it possible to expand wireless LAN areas without installing a plurality of LAN base stations or wireless LAN repeaters.

The encapsulation allows a plurality of wireless LAN terminals to communicate with the wireless LAN base station via a wireless LAN terminal having the wireless LAN base station function.

Further, the present invention encapsulates a wireless LAN signal sent from the wireless LAN terminal having the wireless LAN base station function together with a wireless LAN signal sent from a wireless LAN terminal connected to the wireless LAN terminal having the wireless LAN base station function. Consequently, it is possible to reduce the number of wireless LAN signal packets. Likewise, the present invention encapsulates a wireless LAN signal destined for the wireless LAN terminal having the wireless LAN base station function together with a wireless LAN signal destined for a wireless LAN terminal connected to the wireless LAN terminal having the wireless LAN base station function. Consequently, it is also possible to reduce the number of wireless LAN signal packets.

What is claimed is:

1. A wireless LAN terminal comprising:
a reception means for receiving a wireless LAN signal from another wireless LAN terminal;
an encapsulation means for encapsulating the wireless LAN signal in OSI layer 2 by providing the wireless LAN signal with a header having its own terminal's MAC address as an originating MAC address and a wireless LAN base station's MAC address as a destination MAC address, such that the encapsulated wireless LAN signal includes at least two headers, each including an originating MAC address and a destination MAC address;
a transmission means for transmitting the encapsulated wireless LAN signal to the wireless LAN base station;
a means for, when a first hierarchy inquiry is received from said another wireless LAN terminal, transmitting a second hierarchy inquiry containing a hierarchy incremented by one higher than a hierarchy contained in the first hierarchy inquiry to the wireless LAN base station; and
a means for, when a first hierarchy response is received from the wireless LAN base station, transmitting a second hierarchy response containing the same hierarchy as that contained in the first hierarchy response to said another wireless LAN terminal.

2. A wireless LAN base station comprising:
an encapsulation means for encapsulating a wireless LAN signal destined for a first wireless LAN terminal in OSI layer 2 by providing the wireless LAN signal with a header having its own base station's MAC address as an originating MAC address and a second wireless LAN terminal's MAC address as a destination MAC address, such that the encapsulated wireless LAN signal includes at least two headers, each including an originating MAC address and a destination MAC address;
a transmission means for transmitting the encapsulated wireless LAN signal to the second wireless LAN terminal;
a means for, when a hierarchy inquiry is received from a wireless LAN terminal, returning a hierarchy response containing the same hierarchy as that contained in the hierarchy inquiry to the wireless LAN terminal which has transmitted the hierarchy inquiry.

3. A wireless LAN terminal comprising:
a reception means for receiving a wireless LAN signal which is destined for another wireless LAN terminal and is encapsulated in OSI layer 2 by being provided with a header having a wireless LAN base station's MAC address as an originating MAC address and own terminal's MAC address as a destination address, such that the encapsulated wireless LAN signal includes at least two headers, each including an originating MAC address and a destination MAC address;
an extraction means for extracting the wireless LAN signal from the encapsulated wireless LAN signal;
a transmission means for transmitting the extracted wireless LAN signal to said another wireless LAN terminal;
a means for, when a first hierarchy inquiry is received from said another wireless LAN terminal, transmitting a second hierarchy inquiry containing a hierarchy incremented by one higher than a hierarchy contained in the first hierarchy inquiry to said another wireless LAN base station; and
a means for, when a first hierarchy response is received from the wireless LAN base station, transmitting a second hierarchy response containing the same hierarchy as that contained in the first hierarchy response to said another wireless LAN terminal.

4. A wireless LAN terminal comprising:
a reception means for receiving a wireless LAN signal which is transmitted from a first wireless LAN terminal and is encapsulated in OSI layer 2 by being provided with a header having a second wireless LAN terminal's MAC address as an originating MAC address and own base station's MAC address as a destination address, such that the encapsulated wireless LAN signal includes at least two headers, each including an originating MAC address and a destination MAC address;
an extraction means for extracting the wireless LAN signal from the encapsulated wireless LAN signal; and
a means for, when a hierarchy inquiry is received from a wireless LAN terminal, returning a hierarchy response containing the same hierarchy as that contained in the hierarchy inquiry to the wireless LAN terminal which have transmitted the hierarchy inquiry.

5. A wireless LAN terminal comprising:
a first reception means for receiving a wireless LAN signal from another wireless LAN terminal;
an encapsulation means for encapsulating the wireless LAN signal in OSI layer 2 by providing the wireless LAN signal with a header having its own terminal's MAC address as an originating MAC address and a wireless LAN base station's MAC address as a destination MAC address, such that the encapsulated wireless LAN signal includes at least two headers, each including an originating MAC address and a destination MAC address;

a first transmission means for transmitting the encapsulated wireless LAN signal to the wireless LAN base station;

a second reception means for receiving a wireless LAN signal which is destined for said another wireless LAN terminal and is encapsulated in OSI layer 2 by being provided with a header having the wireless LAN base station's MAC address as an originating MAC address and own terminal's MAC address as a destination address;

an extraction means for extracting the wireless LAN signal from the encapsulated wireless LAN signal received by the second reception means;

a second transmission means for transmitting the extracted wireless LAN signal to said another wireless LAN terminal;

a means for, when a first hierarchy inquiry is received from said another wireless LAN terminal, transmitting a second hierarchy inquiry containing a hierarchy incremented by one higher than a hierarchy contained in the first hierarchy inquiry to the wireless LAN base station; and a means for, when a first hierarchy response is received from the wireless LAN base station, transmitting a second hierarchy response containing the same hierarchy as that contained in the first hierarchy response to said another wireless LAN terminal.

6. A wireless LAN terminal which communicates with a wireless LAN base station directly or via another wireless LAN terminal, comprising:

an inquiry means for sending a hierarchy inquiry to said another wireless LAN terminal and, to the wireless LAN base station; and a roaming means for roaming from said another wireless LAN terminal to the wireless LAN base station when it is detected that a hierarchy indicated by a hierarchy response from the wireless LAN base station to the hierarchy inquiry is lower than a hierarchy indicated by a hierarchy response from said another wireless LAN terminal to the hierarchy inquiry.

7. A roaming method for a wireless LAN terminal to communicate with a wireless LAN base station directly or via another wireless LAN terminal, comprising the steps of:

making inquiries by sending a hierarchy inquiry to said another wireless LAN terminal and, to the wireless LAN base station; and roaming from said another wireless LAN terminal to the wireless LAN base station when it is detected that a hierarchy indicated by a hierarchy response from the wireless LAN base station to the hierarchy inquiry is lower than a hierarchy indicated by a hierarchy response from said another wireless LAN terminal to the hierarchy inquiry.

* * * * *